(12) United States Patent
Carney Landow

(10) Patent No.: US 11,218,525 B2
(45) Date of Patent: Jan. 4, 2022

(54) SYSTEMS AND METHODS FOR ADAPTING CONTENT DELIVERY BASED ON ENDPOINT COMMUNICATIONS

(71) Applicant: DISH Network L.L.C., Englewood, CO (US)

(72) Inventor: Kate Megan Carney Landow, Denver, CO (US)

(73) Assignee: DISH Network L.L.C.

( * ) Notice: Subject to any disclaimer, the term of this patent is extended or adjusted under 35 U.S.C. 154(b) by 0 days.

(21) Appl. No.: 16/748,316

(22) Filed: Jan. 21, 2020

(65) Prior Publication Data
US 2021/0227009 A1    Jul. 22, 2021

(51) Int. Cl.
*H04L 29/06*    (2006.01)

(52) U.S. Cl.
CPC ........ *H04L 65/4084* (2013.01); *H04L 65/602* (2013.01); *H04L 65/608* (2013.01)

(58) Field of Classification Search
CPC ..... H04L 65/00; H04L 65/40; H04L 65/4007; H04L 65/4069; H04L 65/4084; H04L 65/60–602; H04L 65/608
See application file for complete search history.

(56) References Cited

U.S. PATENT DOCUMENTS

| | | | |
|---|---|---|---|
| 4,955,388 A * | 9/1990 | Silberstein | A61B 5/16 600/544 |
| 6,708,335 B1 * | 3/2004 | Ozer | H04N 7/163 348/E7.061 |
| 7,242,406 B2 | 7/2007 | Robotham et al. | |
| 8,046,798 B1 | 10/2011 | Schlack et al. | |
| 8,190,674 B2 | 5/2012 | Narayanan et al. | |
| 8,667,527 B2 | 3/2014 | Yan et al. | |
| 8,694,396 B1 * | 4/2014 | Craner | H04N 21/44016 705/32 |
| 8,855,681 B1 | 10/2014 | George et al. | |
| 8,918,636 B2 | 12/2014 | Kiefer et al. | |
| 9,015,737 B2 * | 4/2015 | Garza | H04N 21/4126 725/12 |

(Continued)

OTHER PUBLICATIONS

Subsidiaries of Dish Network—sec.gov (Year: 2018).*

(Continued)

*Primary Examiner* — Boris D Grijalva Lobos
(74) *Attorney, Agent, or Firm* — Kilpatrick Townsend & Stockton LLP

(57) ABSTRACT

Methods, systems, and machine-readable to adapt delivery of content composites to an endpoint media device are disclosed. A first content composite may be transmitted via a packet stream to an endpoint media device. A communication from the endpoint media device that is indicative of having output at least part of the first content composite for display may be processed. Operational data from that is indicative of operations executed by the endpoint media device or a communication device may be processed and mapped to one or more operational values correlated to a metric that corresponds to endpoint disconnection with the first content composite may be identified. A second content composite to be inserted into the packet stream to the endpoint media device may be selected. The second content composite may be transmitted via the packet stream from the content provider system to the endpoint media device.

20 Claims, 5 Drawing Sheets

(56) References Cited

U.S. PATENT DOCUMENTS

| | | |
|---|---|---|
| 9,581,962 B1* | 2/2017 | Duffy .................. G03H 1/26 |
| 9,712,587 B1* | 7/2017 | Alfishawi ............ A61B 5/165 |
| 9,848,249 B2 | 12/2017 | Freed et al. |
| 9,918,134 B2 | 3/2018 | O'Hanlon |
| 10,650,409 B1* | 5/2020 | Smith ............... G06Q 30/0255 |
| 10,699,488 B1* | 6/2020 | Terrano ............. G06T 15/50 |
| 10,796,345 B1* | 10/2020 | Qureshi ............. H04L 65/602 |
| 2002/0090198 A1 | 7/2002 | Rosenberg et al. |
| 2003/0036944 A1* | 2/2003 | Lesandrini ........... G06Q 30/02 705/7.32 |
| 2004/0117821 A1* | 6/2004 | Karaoguz ........... H04L 65/4076 725/37 |
| 2004/0117827 A1* | 6/2004 | Karaoguz .......... H04N 21/2408 725/42 |
| 2005/0086110 A1* | 4/2005 | Haley ................ G06Q 30/02 705/14.52 |
| 2006/0089870 A1 | 4/2006 | Myhr |
| 2008/0109307 A1 | 5/2008 | Ullah |
| 2008/0195457 A1 | 8/2008 | Sherman et al. |
| 2008/0300982 A1 | 12/2008 | Larson et al. |
| 2009/0044217 A1 | 2/2009 | Lutterbach et al. |
| 2009/0193126 A1 | 7/2009 | Agarwal et al. |
| 2010/0153983 A1 | 6/2010 | Philmon et al. |
| 2010/0179867 A1 | 7/2010 | Hughes |
| 2012/0052941 A1 | 3/2012 | Mo |
| 2012/0166452 A1* | 6/2012 | Tseng ............... H04L 65/403 707/749 |
| 2012/0254456 A1 | 10/2012 | Visharam et al. |
| 2013/0014171 A1* | 1/2013 | Sansom ............. H04L 65/1059 725/52 |
| 2013/0138664 A1* | 5/2013 | Bill .................. G06Q 30/0633 707/748 |
| 2013/0174196 A1 | 7/2013 | Herlein |
| 2013/0205314 A1* | 8/2013 | Ramaswamy ... H04N 21/44218 725/14 |
| 2013/0268954 A1* | 10/2013 | Hulten ............... H04N 21/442 725/12 |
| 2013/0326024 A1 | 12/2013 | Chen et al. |
| 2014/0081749 A1* | 3/2014 | Abuelsaad ........... G06Q 30/02 705/14.53 |
| 2014/0101118 A1 | 4/2014 | Dhanapal |
| 2014/0172579 A1* | 6/2014 | Peterson ........... G06Q 30/0269 705/14.66 |
| 2014/0247931 A1 | 9/2014 | Swamy et al. |
| 2014/0351045 A1 | 11/2014 | Abihssira et al. |
| 2015/0020097 A1 | 1/2015 | Freed et al. |
| 2015/0271541 A1* | 9/2015 | Gonder ............... H04L 65/608 725/134 |
| 2015/0302462 A1* | 10/2015 | Chan ................ G06Q 30/0243 705/14.42 |
| 2016/0196574 A1* | 7/2016 | Ganesh ............. G06Q 30/0246 705/14.45 |
| 2016/0294908 A1* | 10/2016 | Conklin ............... H04L 65/60 |
| 2017/0118263 A1 | 4/2017 | Crabtree et al. |
| 2017/0118515 A1* | 4/2017 | Dey ................... H04N 21/812 |
| 2017/0228774 A1* | 8/2017 | Sallas ................ G06F 16/9535 |
| 2017/0262897 A1* | 9/2017 | Bell ................. G06Q 30/0255 |
| 2017/0295503 A1 | 10/2017 | Govindaraju |
| 2018/0184169 A1* | 6/2018 | Maughan ........... H04N 21/4532 |
| 2018/0191796 A1* | 7/2018 | Gandhi .............. H04N 21/251 |
| 2018/0295134 A1 | 10/2018 | Gupta |

OTHER PUBLICATIONS

U.S. Appl. No. 16/264,644, filed Jan. 31, 2019 Non Final Rejection dated Nov. 15, 2019, all pages.

U.S. Appl. No. 16/383,300, filed Jan. 31, 2019 Notice of Allowance dated Apr. 21, 2020 all pages.

* cited by examiner

SYSTEMS AND METHODS FOR ADAPTING CONTENT DELIVERY BASED ON ENDPOINT COMMUNICATIONS

This disclosure generally relates to content delivery, and more particularly to systems and methods for adapting content delivery based on endpoint communications.

BACKGROUND

Users of televisions and other video distribution platforms are now exposed to more varying types of content than ever before. However, with the proliferation of different content, a viewer can encounter a number of difficulties. For example, overexposure to content of a similar nature or source can lead to a reduction in user interest in receiving the content. Continued overexposure to content that is similar in nature or source may be perceived as redundant or uninteresting by users, and may degrade the overall quality of user experience.

Thus, there is a need for systems and methods that address the foregoing problems in order to provide viewers with better, more tailored viewer experiences. This and other needs are addressed by the present disclosure.

BRIEF SUMMARY

Certain embodiments of the present disclosure relate generally to content delivery, and more particularly to systems and methods for adapting content delivery based on endpoint communications.

In various aspects, methods, systems, and non-transitory, machine-readable to adapt delivery of content items to an endpoint media device are disclosed and may provide for one or a combination of the following. Transmission of a first content item via a packet stream from a content provider system via one or more networks to an endpoint media device may be caused. A communication from the endpoint media device that is indicative of the endpoint media device having output at least part of the first content item for display may be processed. Operational data from the endpoint media device that is indicative of one or more operations executed by one or both of the endpoint media device and a communication device may be processed. The communication device may be different from the endpoint media device. The operational data may be mapped to one or more values in a set of operational values correlated to a plurality of endpoint metrics. Consequent to the mapping of the operational data to the one or more values, a metric of the plurality of endpoint metrics that corresponds to endpoint disconnection with the first content item may be identified. Consequent to the identifying of the metric, a second content item to be inserted into the packet stream to the endpoint media device may be selected. The second content item may be identified as being different from the first content item based at least in part on metadata of the second content item. Transmission of the second content item via the packet stream from the content provider system via the one or more networks to the endpoint media device may be caused.

In various embodiments, the first content item may be associated with a first content flag identifying the first content item, the second content item may be associated with a second content flag identifying the second content item, and the second content flag may include the metadata of the second content item. In various embodiments, the selecting the second content item may include identifying, within a content repository, a content specification associated with the first content item using the first content flag, and identifying the second content item as associated with a different content specification. In various embodiments, within a time frame of playback of the first content item, contextual data including activity data received from the communication device may be detected. The contextual data may be communicated to a learning engine to classify a level of endpoint disconnection with the first content item, where the level of endpoint disconnection corresponds to the identified metric. The classified level of endpoint disconnection with the first content item in an endpoint file may be stored.

In various embodiments, the one or more operations may correspond to at least one of a command for one or more of pausing playback, skipping forward in time, or changing channels. In various embodiments, the activity data may indicate one or both of a first indication of a duration of interaction with the communication device, and a second indication of whether the interaction is related to the first content item. In various embodiments, the interaction may correspond to one or more of loading content per a uniform resource locator, an operation of a digital assistant, a command from a remote control device, and/or a selection via an application. In various embodiments, the interaction may correspond to a change in endpoint location with respect to the endpoint media device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims. Various embodiments will now be discussed in greater detail with reference to the accompanying figures, beginning with FIG. 1.

Figure 1:
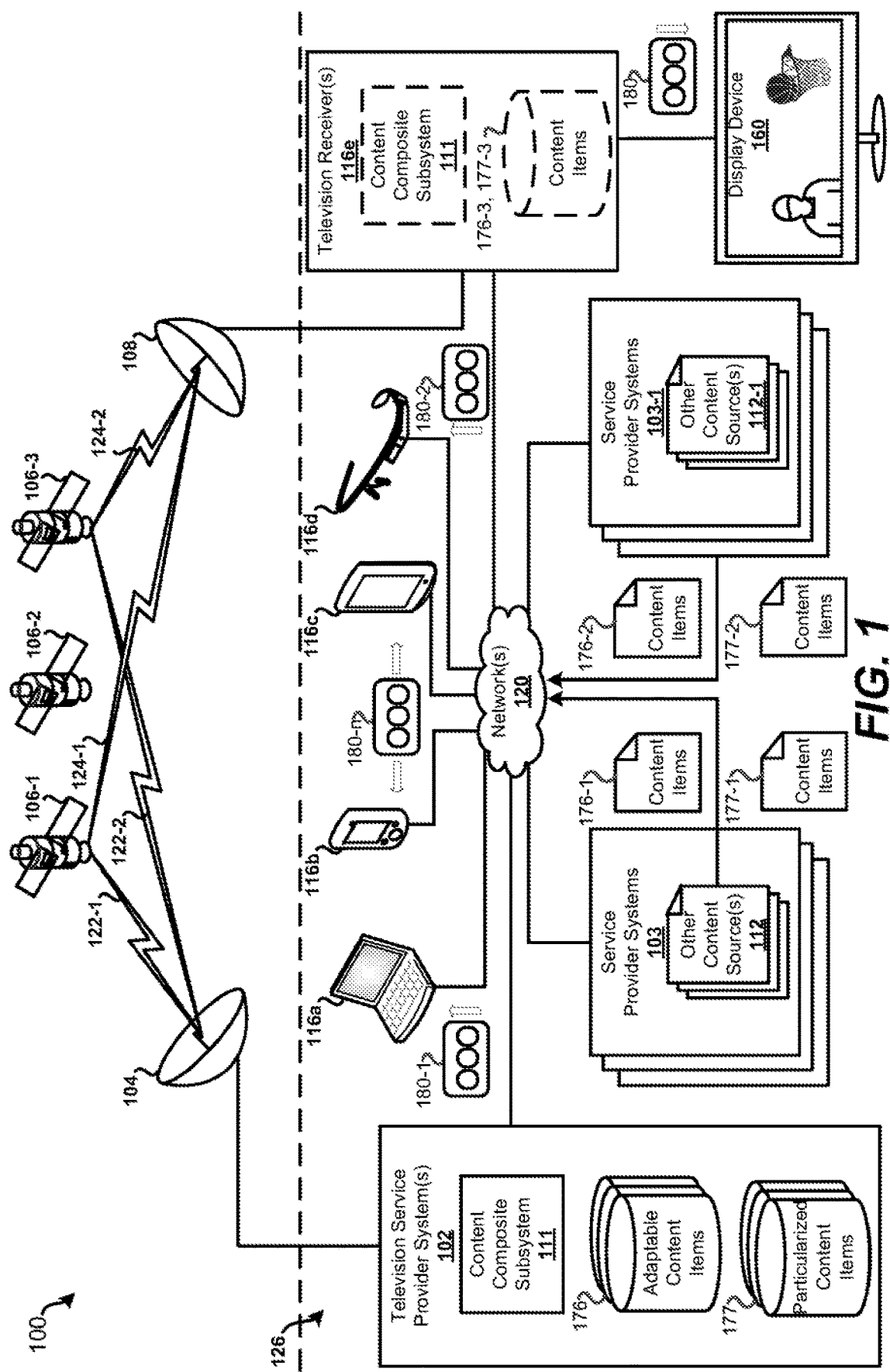
FIG. 1 illustrates a content distribution system, in accordance with disclosed embodiments of the present disclosure.

FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. In general, the system 100 may include a plurality of networks 120 that can be used for bi-directional communication paths for data transfer between components of system 100. Disclosed embodiments may transmit and receive data, including video content, via the networks 120 using any suitable protocol(s), as is disclosed in co-pending U.S. patent application Ser. No. 16/383,300, filed Apr. 12, 2019, the disclosure of which application is incorporated by reference herein in its entirety for all purposes, as if fully set forth herein. The system 100 may include one or more content provider systems 102, one or more other service provider systems 103, and media devices including adaptive routers 110 and various endpoint devices 116 communicatively couplable via the networks 120. As further illustrated, the system 100 may include content satellite uplink 104, uplink signals 122, a plurality of orbiting (e.g., geosynchronous) satellites 106, downlink signals 124, satellite receiver 108, one or more computing devices 116a-d, one or more television receivers 116e, one or more content sources 112 (e.g., online content sources), and one or more display devices 160. Further details of the system 100, its components, and other features pertaining to this application are disclosed in co-pending U.S. patent application Ser. No. 16/655,104, filed Oct. 16, 2019, the disclosure of which application is incorporated by reference herein in its entirety for all purposes, as if fully set forth herein.

The content provider system 102 may include one or more adaptable content item 176 repositories and/or particular content item 177 repositories. The content provider system 102 may store adaptable content items 176 and/or particular content item 177 in the one or more repositories. The one or more repositories may be implemented in various ways. For example, one or more data processing systems may store adaptable content items. One or more relational or object-oriented databases, or flat files on one or more computers or networked storage devices, may store adaptable content items. In some embodiments, a centralized system stores adaptable content items; alternatively, a distributed/cloud system, network-based system, such as being implemented with a peer-to-peer network, or Internet, may store adaptable content items.

Adaptable content items 176 and/or particularized content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure. For example, the content items 176 may be adaptable content items that may correspond to visual and/or audiovisual announcements with graphical and/or audio components particularized to certain types of products and/or services. In some embodiments, the announcements may correspond to commercials to be presented during commercial breaks of television programming, such as televised events. In some instances, the content items 176 may be sourced by one or more of the service provider systems 103.

In some embodiments, the adaptable content items 176 may correspond to video and/or audio video file structures with one or more transition points, hooks, frames, windows, and/or the like for merging with one or more particularized content items, content items 177, particularized to certain products and/or services. As disclosed herein, the adaptable content items 176 may be merged, blended, joined, overlaid, customized, and/or the like in any suitable manner with other particularized content items 177 in order to create electronic content composites 180 particularized to certain types of products and/or services. In various embodiments, as further disclosed herein, the adaptable content items 176 and/or the other content items 177 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and presentation by endpoint media devices 116 as disclosed herein.

In various embodiments, the particularized content items 177 may correspond to content that is particularized to certain types of products and/or services, which may be specified, identified, or otherwise indicated with container flags disclosed further herein. In various embodiments, the particularized content items 177 may be sourced by one or combination of the system 102, one or more of the service provider systems 103, and/or the endpoint media device 116 (e.g., in instances where personalization data that may form at least part of a particularized content item 177). In various embodiments, the service provider systems 103 may correspond to one or more sources of data and/or services corresponding to the adaptable content items 176 and/or the particularized content items 177, and particularized content items 177 may correspond to the specific data and/or services sourced by a specific service provider system 103. For example, the data may correspond to particular digital content that is redeemable to discount product(s) and/or service(s) (i.e., a redeemable content item, such as an ecoupon), matrix code such as a QR code, trailer, movie content, and/or the like. In some embodiments, particularized content items 177 may include personalized content that is particular to one or more viewers. In some embodiments, the personalized content may be separate from the particularized content items 177. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, content items 176 and/or 177 may be actively gathered and/or pulled from one or more data sources 112, for example, by accessing a repository and/or by "crawling" various repositories. Additionally or alternatively, the content provider system 102 and/or the subsystem(s) 111 may wait for updates from one or a combination of the content source systems 112. Content items 176 and/or 177 pulled and/or pushed from the one or more data sources 112 may be transformed, and the transformed content items 176 and/or 177 and/or other data generated based thereon may be made available by the content provider system 102 and/or the subsystem(s) 111 for use by the subsystem(s) 111 in conjunction with content composites 180.

In some embodiments, the content provider system 102 may provide the adaptable content items 176 and, in some embodiments, the particularized content items 177, to the endpoint media device 116 as part of a data transfer that is sent through the satellite 106. For example, in some embodiments, the television receiver 116e may receive a downlinked satellite signal that includes the data for adaptable content items 176 and/or particularized content items 177 transferred on a designated line in the vertical blanking interval (VBI) or other portion of the broadcast service transmission that does not interfere with other transmitted content. Additionally or alternatively, the content provider system 102 may provide adaptable content items 176 and/or particularized content items 177 to the television receiver 116e via the one or more data networks 120. In some embodiments, the content provider system 102 may store the adaptable content items 176 and/or particularized content items 177 in an adaptable content item 176 repository and/or a particularized content items 177 repository included in or otherwise accessible to the content provider system 102. In some embodiments, the television receiver 116e may store the adaptable content items 176 and/or particularized content items 177 in an adaptable content item 176 repository and/or a particularized content items 177 repository included in the television receiver 116e or otherwise local to the television receiver 116e. Consequently, the television receiver 116e may use one or more of the adaptable content items 176 and one or more of the particularized content items 177 in accordance with embodiments disclosed herein. In some embodiments, additionally or alternatively to providing the adaptable content items 176 and/or particularized content items 177, the content provider system 102 may provide content composites 180 to the television receiver 116e through such means.

The content provider system 102 may include a content composite subsystem 111 in whole or in part. In some embodiments, additionally or alternatively, one or more of the endpoint media devices 116 may include a content composite subsystem 111 whole or in part. The extent to which the media devices 116 may be configured to provide features of the subsystem 111 (e.g., by way of software updates and communications from the system 102) may depend on the processing power and storage capabilities of a given device 116. The system 102 may communicate with a given device 116 to pull specifications and current device capability information from the device 116. Based on such communications, the system 102 may the extent to which the device 116 can be configured to provide features of the subsystem 111 and may operate accordingly. For example, the system 102 may push one or more software packages to the device 116 to configure the device 116 to provide a set of one or more features of the subsystem 111. In instances where the device 116 lacks sufficient processing and/or storage capabilities, the subsystem 111 may operate on the system 102. As one example with respect to many features disclosed herein, the filtering of composites 180 may be performed on the backend at system 102 when the device 116 lacks sufficient resources to perform the filtering itself. Further, in some embodiments, additionally or alternatively, one or more service provider systems 103 may include a content composite subsystem 111 in whole or in part. The content composite subsystem 111 may be configured to facilitate various content adaptation features in accordance with various embodiments disclosed herein.

The system 102 with the content composite subsystem 111 may be configured to perform one or more methods for facilitating adaptive content items for delivery in a packet stream, such as methods for containerizing and adapting content items, as disclosed herein. In various embodiments, part or all of the method may be performed while an endpoint media device 116 is receiving programming content and/or is outputting programming content for display. In various embodiments, at least part of the method may be performed in advance of the programming content and, thus, may be performed while is scheduled to output programming content but before the programming content is broadcast to endpoint media devices 116 and/or before the programming content output by an endpoint media device 116 for display. In various embodiments, one or more media devices (e.g., the devices 116a-e and/or the system 102) may perform all or part of the method, with a single media device or multiple media devices performing the method.

One or more content composites 180 may be created to facilitate delivery of the composite 180 and display of one or more content items 176 (in some instances, as modified with particular items 177) in conjunction with a televised event or another type of audiovisual content (movies, shows, etc.). One or more indicators of one or more state changes with respect to the content (e.g., event that is televised, show, etc.) may be detected. The one or more state changes may include upcoming state changes, such as commercial breaks upcoming within a time threshold (e.g., a number of seconds and/or minutes). In some embodiments, the one or more content composites 180 may be created and/or delivered consequent to the detecting the one or more state changes. In some embodiments, the one or more content items 176 may be adapted with one or more particular items 177 consequent to the detecting the one or more state changes. To maintain a consistent user experience, the subsystem 111 may employ synchronization methodologies to detect and abide by time boundaries of the particular commercials in the commercial breaks when replacing the commercials with content items 176, 177 and/or content composites 180 so that the substitution operations insert the content items 176, 177 and/or content composites 180 into the packet stream so as to maintain the same time boundaries and a seamless user experience.

In some embodiments, the creating the content composite 180 and/or the adaptation of the one or more content items 176 with one or more particular items 177 may be a function of contextual data 179 disclosed herein. As disclosed herein, the contextual data 179 may include one or a combination of data indicative of endpoint interaction with a previously presented composite 180 or data indicative of a lack of endpoint interaction with, and inferred disinterest in, a previously presented composite 180. Additionally, the contextual data 179 may include data regarding a current geolocation of the endpoint media device 116, with a set of rules mapped to the current geolocation and specifying geo-specific criteria for creating content composites 180, selecting content items 176 and particularized content items 177, adapting the content items 176 with particularized content items 177, and provisioning the content items 176 and particularized content items 177. The current geolocation of the media device may be determined at a time when the first content is being output for display. With the content composite 180 created and, in some instances, the one or more content items 176 adapted, the one or more content items 176 corresponding to the programming content may be output for display, e.g., during the commercial break, where the content items 176 and particularized content items 177 are selected based at least in part on location metadata mapped to the content items 176 and particularized content items 177 specifying location indicia for the content items 176 and particularized content items 177. Some sets of rules may specify a threshold distance, and the content items 176 and particularized content items 177 may be selected when a distance between the current geolocation of the endpoint media device 116 and the location indicia for the content items 176 and particularized content items 177 satisfies the distance threshold. Some sets of rules may specify that only certain types of particularized content items 177 may be selected when the distance threshold is not satisfied (e.g., promo codes but not ecoupons).

Disclosed embodiments may confirm and verify that a content item 176 (in some instances, as modified with one or more particular content items 177, such as a redeemable content item, matrix code such as a QR code, particularization data, etc.) was transmitted to an endpoint media device 116. Disclosed embodiments may confirm and verify that the modified or unmodified content item 176 was presented with a display device at the endpoint media device 116 (which display device may be integrated with the endpoint media device 116 or otherwise communicatively coupled to the endpoint media device 116). Disclosed embodiments may confirm and verify to what extent the modified or unmodified content item 176 was presented (in full or to a lesser extent). Disclosed embodiments may confirm and verify that the modified or unmodified content item 176 was shown to an intended end user if and when utilizing encryption and/or an encryption flag. Disclosed embodiments may confirm and verify detection of one or more operations executed consequent to the presentation (e.g., scanning a matrix code, loading a redeemable content item and/or another particularized content item 177 into mobile app such as a digital wallet of the endpoint media device 116, utilizing the particularized content items 177 such as to order a product and/or service, etc.) and metrics of the operations (e.g., time of execution). Such confirmations may take the form of return channel notifications from the endpoint device 116 to the system 102, which may contribute to the observation data 229 and feedback loop features disclosed further herein. In addition to such communications from endpoint devices 116, the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like). Such notifications may also contribute to the observation data 229 and feedback loop features. In addition to such communications from endpoint media devices 116, the content provider system 102 may receive context communications subsequent to presentation of the particularized content items 177, in which the context communications indicate user interactions with communication devices in the environment of the endpoint media devices 116 and/or changes in the geolocation of the user. Such context communications may be used by the subsystem 111 as the contextual data 179 or contribute to the contextual data 179 that is indicative of endpoint interaction with a previously presented composite 180 or is indicative of a lack of endpoint interaction with, and inferred disinterest in, a previously presented composite 180. Based at least in part on such contextual data 179, disclosed embodiments may alter a packet stream delivering the particularized content item 177, as disclosed further herein.

Figure 2:
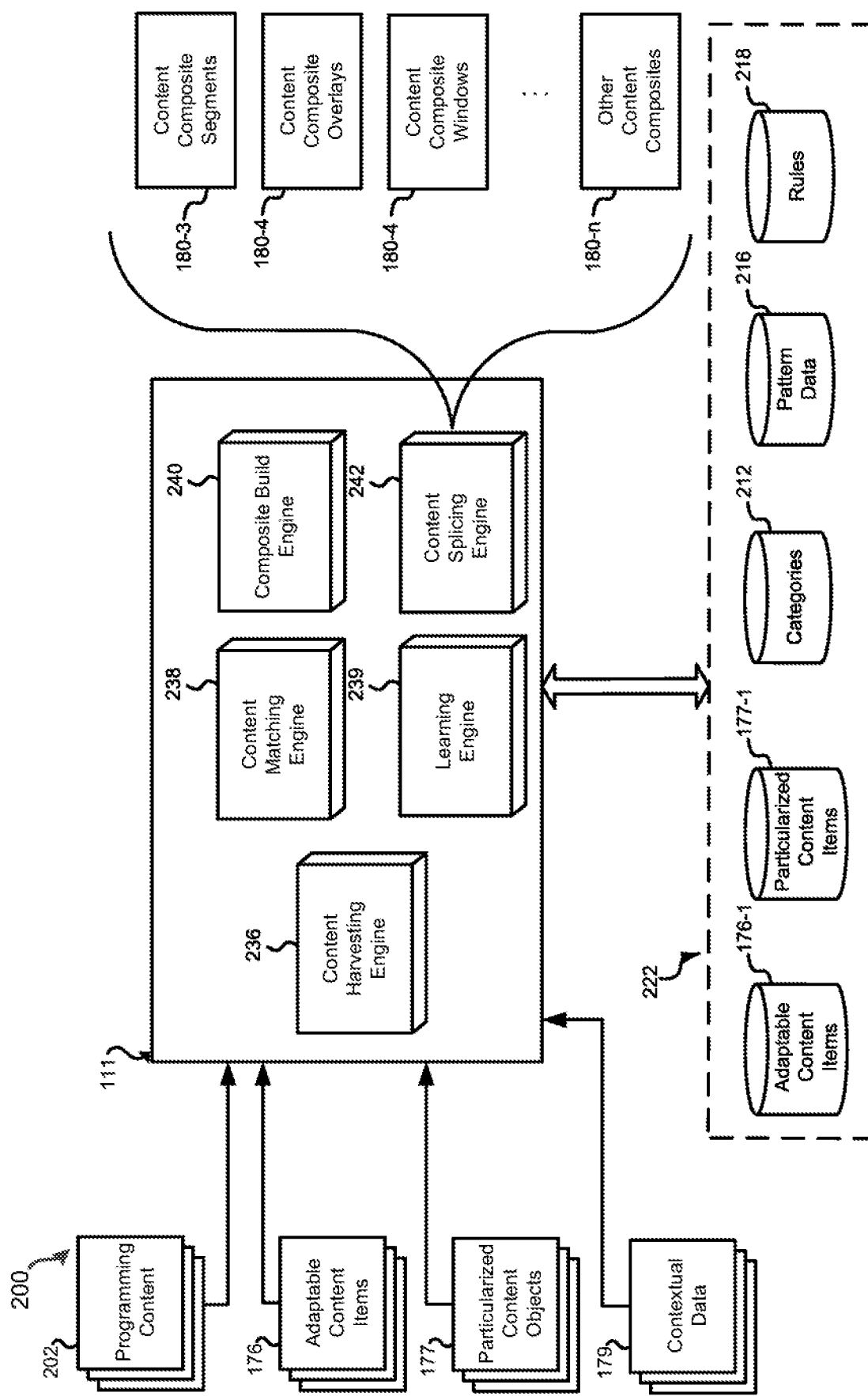
FIG. 2 illustrates a diagram of an adaptive content composite system, in accordance with disclosed embodiments of the present disclosure.

FIG. 2 illustrates a functional diagram of an adaptive content composite system 200, in accordance with disclosed embodiments of the present disclosure. In various embodiments, the content composite system 200 may be included in whole or in part in the content provider system 102 and/or an endpoint media device 116. In some embodiments, the content composite system 200 may be separate from, and provide content to, the content provider system 102. In some embodiments, the content composite system 200 may be included in the end-user system and may be included in the television receiver 116e and/or one or more of the computing devices 116. In some embodiments, various features of the content composite system 200 may be distributed between the television receiver 116e and upstream of the television receiver 116e. Likewise, in some embodiments, various features of the content composite system 200 may be distributed between one or more of the computing devices 116 and upstream of the one or more computing devices 116. While not all components of the adaptive content composite system 200 are shown, the system 100 may include one or a combination of such components.

As depicted, the content composite system 200 includes a content composite subsystem 111. The content composite subsystem 111 may include or otherwise correspond to an audiovisual control engine that, as with disclosed embodiments of the other engines, may include instructions retained in processor-readable media and to be executed by one or more processors. The content composite subsystem 111 may be communicatively coupled with interface components and communication channels (e.g., of the television receiver 116e and/or the computing device 116, which may take various forms in various embodiments as disclosed herein) configured to receive programming content 202, which may correspond to televised sporting events, movies, television programs, portions thereof, etc. In various embodiments, the programming content 202 may include audiovisual content broadcast and/or otherwise transmitted by the content provider system 102 and/or one or more other service providers 103. The programming content 202 may include various components, including without limitation, one or more video tracks, audio tracks, audio video tracks, metadata tracks, close captioning information, and/or the like. In some embodiments, the content composite system 200 may retain received programming content 202 in content storage 222. The content storage 222 may include any suitable form of storage media, such as any suitable form disclosed herein.

The content composite subsystem 111 may be further configured to receive adaptable content items 176 and particularized content items 177. The content composite subsystem 111 may include a harvesting engine 236 configured to aggregate adaptable content items 176, particularized content items 177, and/or programming content 202 in order to facilitate content splicing features disclosed herein. The content composite subsystem 111 may include a matching engine 238, which, in various embodiments, may be configured to analyze, classify, categorize, characterize, tag, and/or annotate adaptable content items 176, particularized content items 177, and/or programming content 202.

The content composite subsystem 111 may include a content splicing engine 242. In some embodiments, the content splicing engine 242 may include a multiplexer. In various embodiments, the multiplexer may create a digital stream of data packets containing the video, audio, and, in some embodiments, the metadata to output the programming content 202, adaptable content items 176, and/or the composites 180 created with selected adaptable content items 176. In various embodiments, the content splicing engine 242 may be implemented at the receiver 116e, the device 116, and/or the service provider system 102.

In some embodiments where the content splicing engine 242 is implemented at the service provider system 102, the multiplexed data stream may be transmitted via the one or more networks 124 for provisioning to computing devices 116 or via a particular transponder stream via a transponder of a satellite for provisioning to receivers 116e. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the content provider system 102. A control word generator may generate the control word that is used by a scrambling engine to scramble the video or audio present in the data packet. Control words generated by the control word generator may be passed to a security system, which may be operated by the television service provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for transmission to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

In some embodiments, the harvesting engine 236 may be configured to receive, pull, process, buffer, organize, rank, and/or store adaptable content items 176, particularized content items 177, and/or programming content 202. In various embodiments, the content provider system 102, the television receiver 116e, and/or the computing device 116 may include one or more applications to facilitate the subsystem 111 analyzing and consolidating data feeds and/or event updates received from various data sources 112. As an example, data feeds and/or event updates may include, but are not limited to, updates (real-time and/or otherwise) and/or continuous data streams received from one or more data sources 112, which may include real-time events related to promotions, redeemable content items, special offerings, discounts, sports event information, Twitter® feeds, Instagram® posts, Facebook® updates, Amazon® updates, and/or the like.

As disclosed above, the adaptable content items 176 may be particularized to certain products and/or services. In some embodiments, the adaptable content items 176 may correspond to commercials to be presented during commercial breaks of the programming content 202. In various embodiments, the content items 176 may include audiovisual content broadcast and/or otherwise transmitted by the content provider system 102. In some embodiments, adaptable content items 176 may be pushed by the content provider system 102 to the subsystem 111. In addition or in alternative, adaptable content items 176 may be pulled by the subsystem 111 (e.g., by the harvesting engine 236) from the content provider system 102.

In various embodiments, sets of one or more adaptable content items 176 and/or sets of one or more content items 177 may be transmitted to the subsystem 111 in batches. For example, sets of one or more adaptable content items 176 and/or sets of one or more content items 177 may be transmitted to the subsystem 111 on a periodic or otherwise scheduled basis. The subsystem 111 may store the adaptable content items 176 locally and, subsequently select one or more of the adaptable content items 176 when needed for presentation during an upcoming break in the programming content 202 and/or when needed for presentation during the programming content 202 based at least in part on the subsystem 111 determining specifications of the programming content 202, a temporal progression in the programming content 202 (e.g., the fourth quarter, the second round, etc.), a state change in the event (e.g., a score change, one team or competitor leading or falling behind, etc.), and/or the like.

In various embodiments, sets of one or more adaptable content items 176 and/or sets of one or more content items 177 may be transmitted to the subsystem 111 on an as-needed basis when the subsystem 111 is receiving programming content 202 corresponding to a certain type (e.g., a televised sporting event), is scheduled to receive such programming content 202, is predicted to receive programming content 202 based at least in part on a detected viewing pattern of past viewing of previous programming content 202 (e.g., of a certain type of event, at certain times, on certain days, etc.), and/or is predicted to receive programming content 202 based at least in part on a detected pattern of past viewer responses to content composites 180 for previous programming content 202 of that type. Additionally or alternatively, in some embodiments, sets of one or more adaptable content items 176 and/or sets of one or more content items 177 may be selected (e.g., the service provider system 102) as tailored for particular event viewing habits, ordering patterns, inferred interests of viewers, and/or disinterest of particular viewers in previously presented content items 176, 177 and/or composites 180 inferred from context communications and contextual data 179 disclosed herein.

In various embodiments, based at least in part on contextual communications and data 179 mapped to a particular viewer, endpoint device 116, and/or subset of associated endpoint devices 116 (e.g., associated with one or more users and/or a household), sets of one or more adaptable content items 176 may be selected (e.g., by the service provider system 102) for particular time periods and may be transmitted to the subsystem 111 with an assignment (e.g., by way of tag data or other metadata) for the designated time period. Additionally or alternatively, based at least in part on such contextual communications and data 179, sets of one or more adaptable content items 176 may be selected (e.g., by the service provider system 102) for particular channels and/or television programs and may be transmitted to the subsystem 111 with an assignment (e.g., by way of tag data or other metadata) for the designated channels, shows, movies, and/or television programs. The transmission of the sets of one or more adaptable content items 176 may be in response to the subsystem 111 pulling the sets of one or more adaptable content items 176 from the service provider system 102. For example, the subsystem 111 may pull adaptable content items 176 based at least in part on detecting contextual data 179 that is indicative of endpoint interaction with a previously presented composite 180 or is indicative of a lack of endpoint interaction with, and inferred disinterest in, a previously presented composite 180, detecting programming content 202 currently being viewed via a television receiver 116e or computing device 116, detecting programming content 202 scheduled to be viewed or recorded, predicting programming content 202 of interest to a viewer based on detected viewing patterns and/or patterns of interacting with content items 176, 177, determining upcoming programming content 202 based on electronic programming guide information received, and/or the like.

In a similar manner, sets of one or more content items 177 may be pulled from or pushed by one or more service provider systems 103, in various embodiments using one or more of the various methods disclosed (e.g., based at least in part on contextual data 179 that is indicative of endpoint interaction with a previously presented composite 180 or is indicative of a lack of endpoint interaction with, and inferred disinterest in, a previously presented composite 180), to the subsystem 111 directly or indirectly (e.g., by way of the content provider system 102, which may then transmit the content items 177 to the subsystem 111) for particular time periods, with assignments for designated channels, shows, movies, and/or television programs. For example, in conjunction with the selection of sets of one or more adaptable content items 176, sets of one or more content items 177 that match the one or more adaptable content items 176 may be pulled from one or more service provider systems 103. In various examples, the matching may be based at least in part on specifications of the event, a temporal progression in the event (e.g., the fourth quarter, the second round, etc.), a state change in the event (e.g., a score change, one team or competitor leading or falling behind, etc.), and/or the like.

The subsystem 111 may use the rules 218 to adaptively control and adapt content composite creation, the delivery of such content, and interactions with such content based at least in part on contextual data 179 disclosed herein. The categorization 212 of the harvested regulations and updated regulations may be used to create various sets of rules 218 governing the creation and provisioning of particularized content composites 180. The various sets of rules 218 may govern the creation and provisioning of particularized content composites 180 as a function of a location of a particular receiver 116e and/or device 116. Hence, different sets of rules 218 may apply to different locations. Further, various sets of rules 218 may provide for various types of restrictions and/or specifications on creating and/or provisioning content composites 180. In addition to geolocation restrictions/specifications, the various types of restrictions and/or specifications may include time restrictions, such as limits on a time of day when content composites 180 may be presented, limits on time in advance particular event (e.g., days, hours, etc.) and/or portion thereof ahead of which content composites 180 may be presented, and the like. The specifications and/or regulations may include limitations on the manner in which the content composites 180, based on detected user interactions with communication devices within an environment of the endpoint media device 116. Additionally or alternatively, the various types of restrictions and/or specifications may include restrictions on and/or specifications of types of content (e.g., ratings for different audience designations, content designations, etc.) for which content composites 180 may or may not be presented and the manner in which content composites 180 may be presented for the different types of programs and/or viewers (e.g., adult-directed ads may not be presented during children-directed shows and/or to viewers identified as children). Thus, provisioning of content composites 180 may be further differentiated according to show type and/or viewer type, with time, place, and/or manner restrictions/specifications contingent on show type and/or viewer type. Restrictions on and/or specifications of the manner in which content composites 180 may be presented may include differentiating types of devices (e.g., smart phone versus laptop computer, laptop computer versus television receiver, etc.) which will display the content composites 180.

To facilitate geo-discrimination to differentiate which sets of rules 218 apply to a given content provisioning instance with respect to a program and which content items 176, 177 to select and present as a function of the current device 116 location, disclosed embodiments may provide for capturing and analyzing location data for the device 116 to determine a current location of the device 116. The current location of the device 116 may also be used to identify, by a system 102, 103 and/or an application of the device 116, when a content item 177 stored by the device 116 (e.g., in a digital wallet) is applicable based at least in part on location metadata of the content item 177 that specifies a product/service provider location that is within a threshold distance from the current location. The threshold distance may be specified by the location metadata, user preferences, application settings, and/or the system 102, 103. In instances where the threshold is satisfied, one or more push notifications may be transmitted from one of the systems 102, 103 to the endpoint media device 116; the application of the endpoint media device 116 may be invoked, awakened, opened, otherwise activated; and/or the application may pop up a notification on a display of the endpoint media device 116 to alert the user to the content item 177 and the proximate provider location.

As disclosed, the contextual data 179 may include location data may also be captured to facilitate geo-sensitive adaptive content splicing adaptive content splicing with respect to content 202 corresponding to a televised event as a function of a location detected for the device 116 that receives the content and is to cause display of content composites 180 in conjunction with the content. In various embodiments, the matching engine 238 may include a location correlation engine that may correlate location data to a set of one or more zip codes (or other postal codes) and a corresponding rule set identifier for a set of one or more rules 218 mapped to the set of one or more zip codes (or other postal codes) via identifiers keyed with one or more tables and/or indexes.

In various embodiments, location data may be determined by television receivers 116e and/or devices 116, and such data may be sent to the system 102. The television receivers 116e and/or devices 116 may, in some embodiments, have location detection capabilities based at least in part on location data provided by way of device GPS capabilities, Wi-Fi, cellular, other access points, subscriber/account information, and/or the like techniques for determining a current location of the respective receiver 116e and/or device 116, and corresponding location data may be transmitted to the system 102. In some embodiments, the system 102 may gather the location data. In some embodiments, where the location data does not explicitly indicate a geo-location, the system 102 may determine geo-locations by cross-referencing subscriber/account identifiers with stored geolocation data associated with subscribers/accounts.

Additionally, in some embodiments, the receiver 116e and/or device 116 may be capable of communicating with a Global Positioning System (GPS) in order to determine to location of the respective receiver 116e and/or device 116.

The antenna may be a GPS receiver or otherwise include a GPS receiver. In various embodiments, communication with the receiver 116e and/or device 116 may be conducted with a single antenna configured for multiple purposes (e.g., cellular, transactions, GPS, etc.), or with further interfaces (e.g., three, four, or more separate interfaces). In some embodiments, an application installed on the receiver 116e and/or device 116 may cooperate with the system 102 to facilitate tracking of locations of the receiver 116e and/or device 116. For example, the receiver 116e and/or device 116 may transmit location data to any suitable backend system component. The location data may be a combination of data based on one or a combination of GPS, Wi-Fi, cellular, device sensor(s) such as a barometric sensor or accelerometer, RFID device signals, and/or other techniques for determining a current location of the receiver 116e and/or device 116.

The receiver 116e and/or device 116 may access the one or more networks 120 through one or more wireless links to one or more access points. The access points may be of any suitable type or types. For example, an access point may be a cellular base station, an access point for wireless local area network (e.g., a Wi-Fi access point), an access point for wireless personal area network (e.g., a Bluetooth access point), etc. The access point may connect the receiver 116e and/or device 116 to the one or more networks 120, which may include the Internet, an intranet, a local area network, a public switched telephone network (PSTN), private communication networks, etc. In some embodiments, access point(s) may be used in obtaining location data for the receiver 116e and/or device 116.

Figure 3:
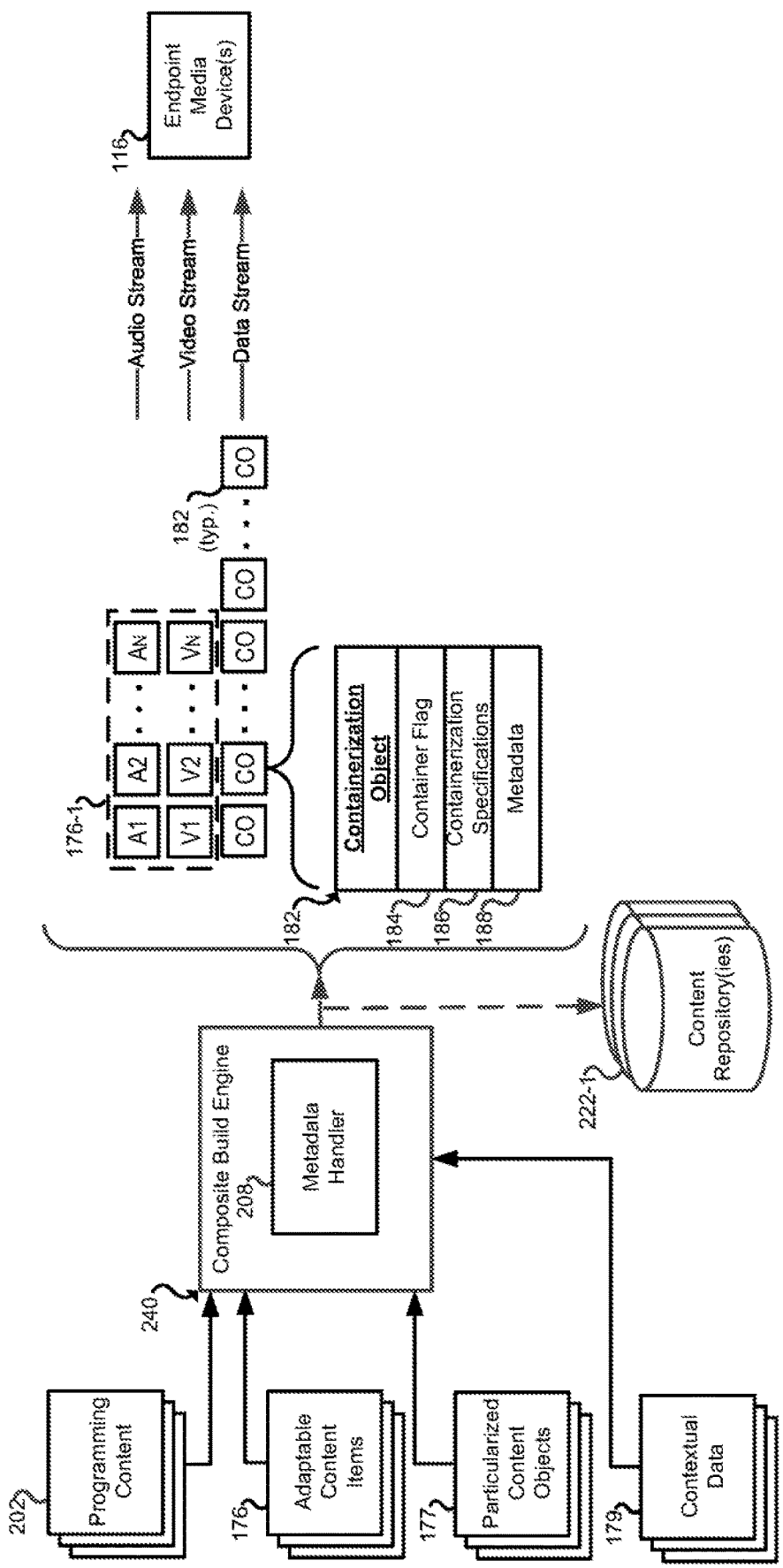
FIG. 3 illustrates a composite build engine, in accordance with disclosed embodiments of the present disclosure.

FIG. 3 is a simplified illustration of a composite build engine 240, in accordance with disclosed embodiments of the present disclosure. In various embodiments, the composite build engine 240 may be included in the subsystem 111 or may be separate from the subsystem 111. The composite build engine 240 may, in some embodiments, be included in the content provider system 102. Having processed an adaptable content item 176, the subsystem 111 may create one or more content composites 180 that may include the adaptable content item 176.

To create the content composites 180, disclosed embodiments may provide the content item 176 with containerization objects 182 that each containerize a set of data as a persistent object in time. Each containerization object 182 may be configured to function in a broadcast environment while facilitating the various features disclosed herein. For example, among other things, the containerization object 182 may create the ability for the disclosed deeper integration with endpoint devices 116 in a broadcast environment. With the containerization object 182, the content composites 180 may allow the content item 176 to be treated as an object wrapped with an identity and with one or more layers of encryption. As disclosed herein, the one or more layers of encryption provided with various embodiments may correspond to encryption at one or more software layers, as distinguishable from hardware encryption of a device 116. The various embodiments of one or more layers of encryption may allow for encryption of one or a combination of return channel communications, data regarding endpoint device 116 operations that contribute to observation data 229, content items 176, content items 177, composites 180, and/or components thereof, which may particularly include encryption of personalization and transactional data, which may provide for DRM, and which may ensure end user privacy.

The composite build engine 240 may configure the containerization object 182 to include a container flag 184. The container flag 184 may include one or more parameters that indicate one or more containerization specifications 186. The container flag 184 may be thin and may indicate other components packetized in the containerization object 182. For example, in various embodiments, container flag 184 may include indicia of one or a combination of: an identifier of the content item 176 in the container, boundaries of the set of one or more audio and/or video packets that form the content item 176, access and reference to one or more other containerization specifications 186, access and reference to other metadata 188, and/or the like. The content item identifier may correspond to a field with parameters that identifies the content item 176.

Further, the composite build engine 240 may configure the containerization object 182 to include the containerization specifications 186 to facilitate performance of a set of one or more operations by the one or more endpoint media devices 116 with respect to the content item 176 consequent to the one or more endpoint devices 116 receiving the content composite 180. In various embodiments, the containerization specifications 186 may include one or a combination of instructions, metadata, personalization content or instructions to fetch personalization content, and/or the like to specify and facilitate performance of the set of one or more operations by an endpoint media device 116. In some embodiments, the containerization specifications 186 may include a particularized content item 177 or instructions to fetch a particularized content item 177.

Accordingly, the content composite 180 may include the content item 176 and the containerization object 182. Further, in various embodiments, the content composite 180 may include a particularized content item 177 at the time the content composite 180 is transmitted to one or more endpoint media devices 116, separate from or grafted into the content item 176 such that the content item 176 is an adapted content item 176 adapted with the particularized content item 177. In some embodiments, the content composite 180 may not include a particularized content item 177 at the time the content composite 180 is transmitted to one or more endpoint media devices 116. In such instances, the particularized content item 177 may be fetched per the containerization specifications 186 from the system 102, 100, another data source 103, or from storage of the endpoint media device 116, and may be used by an endpoint media device 116 to adapt the content item 176. The containerization specifications 186 may include instructions and build specifications according to which the endpoint media device 116 may merge the pulled/retrieved particularized content item 177 with the content item 176. As part of the instructions and build specifications, the containerization specifications 186 may specify that the particularized content item 177 (e.g., a particular redeemable content item, matrix code such as a QR code, trailer, movie content, and/or the like) contain one or more date and/or time attributes (e.g., a time stamp) indicate of one or a combination of when the item was created, when the item is to be output by the endpoint media device 116 for display, when the item is stored by the endpoint media device 116 (e.g., in a digital wallet), and/or the like. In some embodiments, the one or more date and/or time attributes may be stored with the metadata 188.

In various embodiments, the content composite 180 may further include personalization content personalized to the end user of the endpoint media device 116 at the time the content composite 180 is transmitted to one or more endpoint media devices 116, separate from or grafted into the content item 176 such that the content item 176 is an adapted content item 176 adapted with the personalization content. In some embodiments, the content composite 180 may not include personalization content at the time the content composite 180 is transmitted to one or more endpoint media devices 116. In such instances, the personalization content may be fetched per the containerization specifications 186 from the system 102, 100, another data source 103, or from storage of the endpoint media device 116, and may be used by an endpoint media device 116 to adapt the content item 176 according to instructions and build specifications of the containerization specifications 186.

The subsystem 111 may transmit the content composite 180 to one or more endpoint media devices 116, and, in some embodiments, may broadcast the content composite 180 to a plurality of endpoint media devices 116. The subsystem 111 may transmit the content composite 180 in accordance with composite transmission specifications. The composite transmission specifications may at least partially specify transmission parameters that govern transmission of the containerization object 182 in a data stream with the set of one or more audio and/or video packets in audio and/or video streams corresponding to the content item 176.

The content item 176 may correspond to a specific unit within the content stream. The specific unit in the content stream may correspond to a section of the video stream that includes the set of one or more audio and/or video packets for the content item 176. The composite transmission specifications may specify how the containerization object 182 should be transmitted in the data stream with the content item 176, how many instances of the containerization object 182 should be created and transmitted, how should some instances of the containerization object 182 be time/place shifted in advance of the packets corresponding to the content item 176, and/or the like. Thus, the composite transmission specifications may provide for one or more instances of the containerization object 182 particularized for the individual content item 176 to be transmitted within the data stream of the content stream, with the content item 176 transmitted in the audio and/or video stream(s). Accordingly, a number of instances of the containerization object 182 with the content item identifier, as specified by the composite transmission specifications, may be embedded in a section of the data stream that indicates the content item 176. Not only may the containerization object 182 with the container flag 184 be carried as a data stream with the audiovideo content stream, flagging the content item 176, it may also be replicated and encoded in a carousel manner per the composite transmission specifications to facilitate pick-up mid-stream of the content item 176, and/or in advance of the content item 176 in the stream to facilitate forward identification of the upcoming content item 176.

The container flag 184 and its indicia may be encrypted and transmitted to the endpoint media device(s) 116 in the encrypted state with the content composite 180. Additionally or alternatively, the containerization specifications 186 may be encrypted and transmitted to the endpoint media device(s) 116 in the encrypted state with the content composite 180. Accordingly, disclosed embodiments may add an encrypted container flag 184 to the content item 176.

In various embodiments, the encrypted container flag 184 may govern access by the endpoint media device 116 to one or more other components of the content composite 180. Consequent to delivery of the content composite 180 to the endpoint media device 116, the endpoint media device 116 may decrypt the encrypted container flag 184. Once the endpoint media device 116 decrypts the container flag 184, the endpoint media device 116 may have access to, for example, the metadata of the content composite 180, such as the instructions of the containerization specifications 186, other containerization specifications 186, and/or the other metadata 188.

The container flag 184 may include indicia that identifies the state and extent of one or more layers of encryption of the content composite 180. One or more of the components of the content composite 180 may be encrypted. The encryption may include a lightweight, point-to-point encryption for specific components of the content composite 180, which may be advantageous to avoid bogging down processing in view of relatively heavier processing needs for video of content items 176 and generally shorter durations of content items 176.

The indicia may flag one or more objects and/or containers for the specific unit(s) within the content stream without the entire data stream being encrypted. The subsystem 111 may all or part of content composite 180 contingent on the extent of the personalization of the content composite 180. For example, when the content composite 180 is transmitted with personalization content, the personalization content may be encrypted. As one example out of many possibilities, when a content item 176 is adapted with a list of items to acquire prepared for an identified viewer, at least the portion of data corresponding to the list may be encrypted, whereas the balance of the content item 176 that is not personalized may not encrypted. Accordingly, a partially customized content composite 180 and/or content item 176 may only be partially encrypted. However, a highly customized content composite 180 and/or content item 176 may be entirely or substantially entirely encrypted, commensurate with the extent of the customization for the identified viewer. For example, if the content item 176 is due to an identified viewer selection (say, a prior procurement, such as the viewer having obtained access permissions to a movie or other particular content), then, after scraping an ID that a viewer has allowed such, the content composite 180 and/or content item 176 (which, for example, may be directed to opening up 1-to-1 connection to access a digital ticket, access to a digital copy of the content, bonus content, a content item that requires tracking such as a redeemable content item for a pay-per-view, etc.) may be entirely or substantially entirely encrypted. Such content may be highly customized and may include watermarking. One or more particularized content items 177, for example, may include watermarks for merging with content items 176 as disclosed herein.

The content composites 180 may provide for advantages with greater layers within a content stream more based around computer language. In some embodiments, various options for content items 176 may be broadcasted, with only a subset of the content items 176 being presented by particular endpoint media devices 116. The indicia of the container flags 184 of the content composites 180 may allow for filtering the content composites 180 according to attributes of the endpoint media device 116 and/or the endpoint viewer so the matching composite 180 is presented to the identified viewer/viewer type, pursuant to the differentiated interaction with mobile app, etc. For example, flag indicia may include layer flag indicia that indicates this content item is for unlocked devices or only locked devices. One layer may allow for identifying different types of the endpoint media devices 116 that differ in capabilities, which, in some embodiments, may be determining based at least in part on pulling information (e.g., device specifications) from the particular endpoint media device 116. Such device type identification may further allow for selectively providing a type of endpoint media device 116 with different types of content items 176 and different content attributes as a function of the device type. For example, such selective provisioning may include filtering content items 176 based at least in part on the differences in frame rate of the content items 176 as a function of the endpoint media device type and/or capabilities. Different content items 176 may be filtered for different endpoint media device 116 (e.g., content items 176 with frame rates associated with fast-changing content may not be mapped to devices with lesser capabilities). As another example, such selective provisioning may include filtering content items 176 based at least in part on the differences in how the content items 176 are compressed as a function of the endpoint media device type and/or capabilities.

One layer may allow for determining endpoint media device 116 authentication. The endpoint media device 116 authentication may be dependent on discovery processes that the determine what is on the device that can be used to sufficiently authenticate the endpoint media device 116. For example, the discovery processes may determine and utilize a SIM card of a mobile device, television receiver with a smartcard, and/or similar identification that can be used to authenticate to set up account. Having determined that the endpoint media device 116 and/or the endpoint has potential to have an account, another layer may allow for search and authentication operations to try to find an account associated with the endpoint media device 116 and/or the endpoint and then authenticate against services related as part of a subscriber account.

Another layer may allow for filtering one or a combination of the content composite 180, the content item 176, the particularized content item 177, and/or the personalization content based at least in part on the authentication and identification of the endpoint viewer. This may include filtering based at least in part on contextual data indicating endpoint interest or disinterest in a previously presented the content item 176, the particularized content item 177, and/or composite 180. As one example, such filtering may include selecting and presenting the content composite 180, the content item 176, the particularized content item 177, and/or the personalization content that correspond to one or more demographics of the identified viewer (e.g., age, marital status, children, pets, renter, homeowner, etc.) and/or viewer type (e.g., flag indicia of NC-17, MA, or another rating so an endpoint device with parental specifications would be provided with appropriate content items). As another example, such filtering may include selecting and presenting the content composite 180, the content item 176, the particularized content item 177, and/or the personalization content that correspond to identified past actions mapped to the endpoint and/or endpoint media device 116. This can result in such differences as presenting content that is directed to, say, "get video subscription service X" versus "because you have video subscription service X, . . . Y." Another layer may allow for creating a backchannel to facilitate communications, ordering, secure video delivery, and/or the like disclosed herein. This can also result in such differences as presenting different content (e.g., a different content item 176, the particularized content item 177, and/or composite 180) when endpoint disinterest in previously presented is inferred based at least in part on contextual communications and data 179.

In some embodiments, the container flag 184 and/or containerization specifications 186 may prompt the endpoint media device 116 to execute the instructions to perform at least one operation of the set of one or more operations facilitated by the containerization object 182. In some embodiments, APIs may be used to instruct the endpoint media device 116 as to what to do with the container flag 184 and/or containerization specifications 186. In some embodiments, the container flag 184 and/or containerization specifications 186 may allow for invoking, waking up, opening, and/or otherwise activating an application of the endpoint media device 116 responsive to the decryption of the container flag 184 and/or containerization specifications 186, in some instances, when the application is offline and/or otherwise not online with respect to the system 102, 100, and/or another system 103.

For example, the container flag 184 and/or containerization specifications 186 may include a read flag that triggers one or more return channel communications. The corresponding instructions may instruct the endpoint media device 116 to report to the system 102, 100, and/or another system 103 with one or more return channel communications one or a combination of: that the content item 176 was received by the endpoint media device 116; that the content item 176 was presented with a display device at the endpoint media device 116; to what extent the content item 176 was presented (in full or to what lesser extent in percentage or another suitable metric); that the content item 176 was shown to an intended endpoint user, detection of one or more operations executed consequent to the presentation (e.g., scanning a matrix code, loading a redeemable content item and/or particularization content into a mobile app such as a digital wallet of the endpoint media device 116, utilizing the particular content items 177 such as to order a product and/or service, etc.) and metrics of the operations (e.g., time of execution); and/or the like. Further, the return channel communications may include one or a combination of: indicia of a particular endpoint user and/or type of endpoint user using the endpoint media device 116 within a time period before and/or when at least part of a content item 176 is/was output for display; indicia of endpoint media device 116 capabilities (e.g., device specifications); indicia of authentication bases such as a SIM card of a mobile device, television receiver with a smartcard, and/or similar identification that can be used to authenticate to set up account; and/or the like.

The return channel communications may contribute to the observation data 229 and feedback loop features disclosed further herein. The containerization specifications 186 may instruct the endpoint media device 116 to report back upon occurrence of each state change and/or to report back per a reporting schedule (e.g., just prior to closure of an application, at end of day, at the end of another reporting period, etc.). In various embodiments, the container flag 184 and/or containerization specifications 186 may include one or more encrypted messages, hashes, and/or the like that each indicate one or more of the above reporting events. Accordingly, the instructions may specify that each return channel notification include a corresponding encrypted message, hash, code, and/or the like, which the system 102, 100, and/or another system 103 may process to verify the respective reporting event and metrics thereof.

In instances where the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like), the notifications may contain indicia of one or a combination of the content item 177, the endpoint device 116, the user associated with the endpoint device 116, a location associated with the use of the content item 177, date and/or time associated with the use of the content item 177, and/or the like. Having received such indicia from a service provider system 103, the subsystem 111 (e.g., the matching engine 238) may correlate the indicia to records stored in a database 222 with identifiers of one or a combination of the content item 177, the endpoint device 116, the user and/or account associated with the endpoint device 116, a location associated with the user, account, and/or endpoint device 116, and/or date and/or time associated with the delivery and/or presentation of the content item 177. The identified correlations may contribute to the observation data 229 and feedback loop features.

In some embodiments, where the content item 176 is not already adapted with the particularized content item 177, the set of one or more operations may include identifying the particularized content item 177 and adapting the content item 176 with the particularized content item 177. When the particularized content item 177 is not included in the content composite 180 when the content composite 180 is received by the endpoint media device 116, the set of one or more operations may include pulling the particularized content item 177 from the system 102, 100, another data source 103 per the containerization specifications 186. In some embodiments, the particularized content item(s) 177 may be transmitted separately from the system 102, 100 and/or another data source 103 prior to the delivery of the content composite 180 such that the endpoint media device 116 stores the particularized content item(s) 177 locally. In such instances, the set of one or more operations may include retrieving the matching particularized content item 177 from storage of the endpoint media device 116 per the containerization specifications 186. Further, in some embodiments, when the particularized content item 177 is not transmitted with the content item 176, the containerization specifications 186 may specify first checking local storage of the endpoint media device 116 for the matching particularized content item 177 and only pulling the particularized content item 177 from the system 102, 100 and/or another data source 103 when the particularized content item 177 is not available from the local storage.

Similarly, the set of one or more operations may include identifying the personalized content that is particular to one or more viewers and adapting the content item 176 with the personalized content. As disclosed herein, in some embodiments, the particularized content item 177 may include personalized content. In such instances, the adapting of the content item 176 with the particularized content item 177 may include adapting of the content item 176 with personalized content. Additionally or alternatively, personalized content may be separate from the particularized content item 177. Hence, where the content item 176 is not already adapted with the personalized content, the personalized content may be included in the content composite 180 when the content composite 180 is received by the endpoint media device 116. When the personalized content is not included in the content composite 180 when the content composite 180 is received by the endpoint media device 116, the set of one or more operations may include retrieving/pulling the personalized content from one or a combination of local storage of the endpoint media device 116, the system 102, 100, and/or another data source 103 per the containerization specifications 186. The containerization specifications 186 may specify first checking local storage of the endpoint media device 116 for the matching personalized content and then pulling the personalized content from the system 102, 100 and/or another data source 103 when at least some of the personalized content is not available (or when sufficient personalized content of one or more specified types is not available) from the local storage or when supplemental personalized content is identified as requested per the containerization specifications 186.

To facilitate the content composite 180, the composite build engine 240 may include a metadata handler 208 that may generate metadata (e.g., one or more tags) corresponding to identifiers, attributes, characteristics, and/or categories of programming content 202, adaptable content items 176, and/or particularized content items 177. In some embodiments, the composite build engine 240 may assign packet identifiers to identify data of the content that is to be transmitted as part of a data stream to an endpoint media device 116 and that is to be associated with one or more tags. Data transmitted as part of a data stream to an endpoint media device 116 may be packetized and assigned packet identifiers. A particular packet identifier may be associated with data packets related to tags for particular segments of programming content 202, adaptable content items 176, and/or particularized content items 177.

The content matching engine 238 may identify a televised event in the programming content 202 and may identify one or more corresponding identifiers, attributes, characteristics, and/or categories of programming content 202, adaptable content items 176, and/or particularized content items 177 of one or more adaptable content items 176 and/or one or more particularized content items 177. Based at least in part on such identification, the composite build engine 240 may create metadata, which, in some embodiments, may correspond to tag data.

Tag data may include an indication of a period of time (or other measure of time, e.g., a number of frames), a start frame, an end frame, and/or the like. Tag data may include or otherwise be associated with a tag identifier and may include event, attribute, characteristic, and/or category identifiers (e.g., associated product, service, organization, etc.). For example, the metadata for the televised event may identify the particular event. The metadata may further identify one or more attributes of the particular event (e.g., any suitable identifier for the participating entities, the location of an event, and/or the like). In some embodiments, at least a portion of the metadata augmentation may be performed at the content provider system 102 such that one or more tagged composite components may be is provided to an endpoint media device 116. Subsequently, the endpoint media device 116 may identify composite components, for example, by processing the metadata. In some embodiments, the container flag 184 may include one or a combination of the tag data, such as identifies of an associated product, service, and/or organization.

The metadata for adaptable content items 176 may, for example, identify the adaptable content items 176 as being adaptable with any suitable identifier, such as a flag, field value, etc. Additionally or alternatively, the metadata for the adaptable content items 176 may identify that the adaptable content items 176 are designated for a certain event or category of events with any suitable identifier. The metadata for the adaptable content items 176 may further identify one or more attributes of the particular event (e.g., any suitable identifier for associated entities, location, a temporal attribute such as a time of an event, and/or the like). Additionally or alternatively, the metadata for the adaptable content items 176 may identify transition points, hooks, frames, windows, other portions designated for overlays, and/or the like for merging with content items 177 such that content from the content items 177 is merged at the transition points, hooks, frames, windows, other portions designated for overlays, and/or the like.

In some embodiments, metadata-augmented adaptable content items 176 may be provided by the service provider system 102 to the endpoint media devices 116, after which the endpoint media devices 116, each having at least a portion of the content composite subsystems 111, may process and use the metadata to facilitate matching adaptable content items 176 with corresponding programming content 202. Likewise, the endpoint media devices 116 may process and use the metadata to facilitate matching adaptable content items 176 with corresponding content items 177. Thus, the metadata may facilitate the endpoint media devices 116 appropriately providing corresponding content composites 180 for display with appropriate placement with respect to televised events, shows, etc. at commercial breaks and/or during presentation of the televised events, shows, etc. Further details relating to the subsystem 111 intelligently selecting and matching items 176, items 177, composites 180, and/or programming content 202 are disclosed in the applications incorporated by reference.

In some embodiments, with contextual data for an identified endpoint mapped to the metadata, attribute, characteristic, and/or category identifier of one or more previously presented items 176, items 177, and/or composites 180, the matching engine 238 may and perform a search of the repositories 222 for one or more items 176, items 177, and/or composites 180 that have metadata that maps to the attribute, characteristic, and/or category identifier (in the case of inferred interest in the previously presented items 176, items 177, and/or composites 180) or for one or more items 176, items 177, and/or composites 180 that have metadata that is different from the attribute, characteristic, and/or category identifier (in the case of inferred disinterest in the previously presented items 176, items 177, and/or composites 180). In such cases where the repositories 222 are searched for one or more content items 177, the one or more content items 177 may have been previously transmitted to the subsystem 111 directly from one or more service provider systems 103 or indirectly from one or more service provider systems 103 by way of the service provider system 102. Further details regarding the subsystem 111 are disclosed in the applications incorporated by reference.

As illustrated by FIG. 2, the content processing subsystem 111 may include a learning engine 239 that may be an analysis engine that employs machine learning. The learning engine 239 may further employ deep learning. Accordingly, the learning engine 239 may facilitate machine learning or, more specifically, deep learning, to facilitate creation, development, and/or use of viewer pattern data 216. As disclosed herein, the subsystem 111 may determine a program, show, etc. that the viewer actually is viewing, is about to view (e.g., the televised event is scheduled to play on the channel that the viewer is currently viewing), or is likely to view as determined with the learning engine 239. The subsystem 111 may push information indicating the televised event to one or more service provider systems 102 and/or 103, as well as indicia of one or more target attributes, characteristics, and/or category identifiers (in the case of inferred interest in the previously presented items 176, items 177, and/or composites 180) or indicia of one or more prohibited attributes, characteristics, and/or category identifiers (in the case of inferred disinterest in the previously presented items 176, items 177, and/or composites 180). In some embodiments, the service provider system 102 may select one or more adaptable content items 176 matching the televised content segment for transfer to the subsystem 111 and either matching the one or more target attributes, characteristics, and/or category identifiers or not matching the one or more prohibited attributes, characteristics, and/or category identifiers. The subsystem 111 may select from the one or more adaptable content items 176 as matching particular segments of the televised segment and, utilizing a content splicing engine 242 in some embodiments, may output one or more corresponding content composites 180 for display after the particular segments and/or simultaneously with the particular segments.

In various embodiments, one or more of the service provider systems 102, 103 may select one or more particularized content items 177 matching the televised event for transfer to the subsystem 111. In some embodiments, one or more of the service provider systems 102, 103 may select a set of one or more particularized content items 177 for transfer (e.g., based on recency of information updates corresponding to the content items 177) for transfer to the subsystem 111, and the subsystem 111 may determine which content items 177 from the set match the televised content segment. As disclosed above, the content composite subsystem 111 may include a matching engine 238 that may include logic to implement and/or otherwise facilitate any taxonomy, classification, categorization, correlation, mapping, qualification, scoring, organization, and/or the like features disclosed herein.

Figure 4:
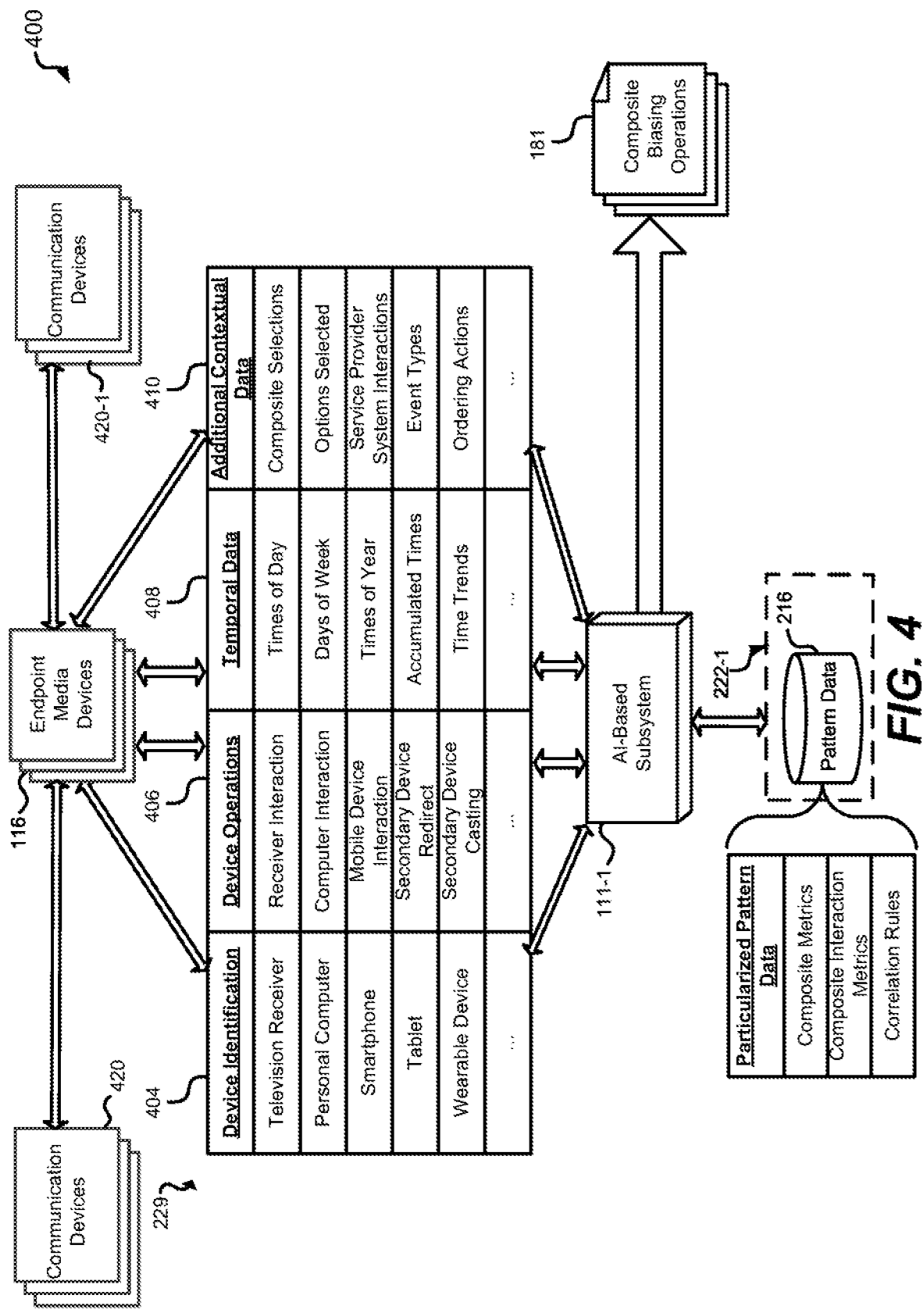
FIG. 4 illustrates certain aspects of subsystem data flow, in accordance with disclosed embodiments of the present disclosure.

FIG. 4 illustrates certain aspects of the AI-based subsystem data flow 400, in accordance with various embodiments of the present disclosure. The content processing subsystem 111 may be configured to gather observation data 229, which may be specific to one or more particular identified users and/or may be generally related to particular endpoint media devices 116. The observation data 229 may include one or a combination of various types of contextual data be gathered from one or more devices 116, aggregated, consolidated, and transformed into viewer pattern profiles that include personalized pattern data 216.

In embodiments where the learning engine 239 is included in an endpoint media device 116, the device 116 may be a self-observer that may additionally gather additional observation data 229. In some embodiments, at least some of the additional observation data 229 may be collected by the communication devices 420 within the environment of the endpoint media device 116, and transmitted to the endpoint media device 116. In various embodiments, data such as the observation data 229 and/or associated viewer profiles, locally stored or cached in the one or more devices 116 may be retrieved and/or received by the content processing subsystem 111 via one or more data acquisition interfaces, which may include interfaces of the content processing subsystem 111, the one or more endpoint media devices 116, and/or the like—through network(s) 120 in various embodiments, through any suitable means for direct communication, and/or through any other suitable means of transferring data. According to various embodiments where the subsystem 111 is included in a service provider system 102, observation data 229 may be actively gathered and/or pulled from the one or more endpoint media devices 116 and/or the communication devices 420. Example communication devices 420 with which the endpoint media device 116 can communicate are mobile communication devices, laptops, smart wearable devices, smart devices, personal digital assistant devices, and/or the like. Data transmission from the communication devices 420 to the endpoint media devices 116 may be on a regular basis such as at the end of predetermined monitoring periods, based on gathering a certain volume of data by one of the communication devices 420, and as part of a polling routine by the endpoint media devices 116.

As disclosed herein, in various embodiments, the one or more data acquisition interfaces may include one or more APIs that define protocols and routines for interfacing with the one or more endpoint media devices 116 and which may specify API calls to/from one or more endpoint media devices 116. In various embodiments, the APIs may include a plug-in to integrate with an application of one or more endpoint media devices 116. The APIs may also include plug-ins to integrate and/or communicate with applications of one or more communication devices 520 and enable API calls to be pushed to/from the endpoint media device 116. The API translation profiles may translate the protocols and routines of the data source component and/or system to integrate at least temporarily with the system and allow one-way communication to the system 102 and/or two-way communication with system 102 in various embodiments by way of API calls.

Some embodiments of the subsystem 111 may aggregate observation data 229 to derive device identification data 404, device operations 406, temporal data 408, and/or additional contextual data 410. The device identification data 404 may include any suitable data for identifying and tracking particular receivers 116e and devices 116; associated accounts, subscribers, and viewers; and/or the like disclosed herein. The device operations data 406 may include any suitable data for identifying and tracking device operations and interactions as those disclosed herein. While the device identification data 404, device operations 406, and/or temporal data 408 may form contextual data, other types of contextual data may be used, for example, in conjunction with device identification data 404, device operations 406, and/or temporal data 408. The additional contextual data 410 may include metrics and patterns of viewer interactions/responses pursuant to provisioning of content composites 180 and service provider system 103 biasing 181. For example, viewer responses to content composites 180 provisioning may include indications of whether the viewer selected a user-selectable options provided with composites 180, the types of such selections, and/or types of consequent interactions with service provider systems 103. For example, the metrics and patterns may take into account whether the viewer opted out of content composites 180, whether the viewer selected links of composites 180 to interact with the platforms and sites of one or more service provider systems 103, whether the viewer selected options to redirect content composites 180 and/or notifications from service provider systems 103 to a secondary device 116, which options and/or service provider systems 103 the viewer selected, whether the viewer used redeemable content items, QR codes, etc. and the types of the viewer's orders, purchases, whether the viewer interacted with the communication devices 420 in association with a product, service or organization associated with the content composites 180, whether a user left the vicinity of the endpoint media device 116 during playback of the content composites 180, other interactions with service provider systems 103, and/or the like. The temporal data 408 may include metrics such as any information to facilitate detection, recognition, and differentiation of one or combination of temporal factors correlated or which the content processing subsystem 111 correlates to other observation data 229 such as device identification data 404, additional contextual data 410, and/or the like. For example, the temporal data 408 may include time of day information, time of week information, time of year information, holiday information, etc. when the viewer made selections, orders, purchases, redemptions of redeemable content items, offers, promo codes, etc.; a number of times that the viewer has interacted with or did not interact with the content composites 180 and/or the like.

Certain examples of additional contextual data 410 may include commands and signals generated during direct interactions with the content composite 180 such as via a user interface of the endpoint media device 116. Viewer use of a user interface or remote control to request a disruption of playback of the content composite 180 may constitute additional contextual data 410. Monitoring of the container flag 184 of a containerization object 182 of the content composite 180 may be used to determine changes to the normal playback of the content composite 180 and detect disruptions. For example, the position of the container flag 184 at different time steps throughout playback may indicate that the viewer has fast forwarded playback of the content composite 180. Changes in the execution of forward error correction routines in processing the content composite 180 for display may also be used to detect fast forwarding of the content composite 180. Similarly, channel changes may result in tuning to different channels, which may be detected by the endpoint media device 116 as additional contextual data 410. The endpoint media device 116 may record the additional contextual data 410 along with temporal data 408 and any relevant device operations data 406 or device identification data 404 data and may pass the collected observation data 229 to the learning engine 239. For example, viewer interaction 406 with a user interface of the endpoint media device 116 may constitute contextual data 410. Such interaction may include picking up a remote, selecting a menu or guide option, or other action indicating that the viewer is not paying attention to the content composite 180 being output for display, and indicia of such may be gathered by the endpoint device 116 as contextual data 410 and stored in a storage medium of device 116 and/or transmitted to a backend instance of the subsystem 111 in the system 102.

Additional contextual data 410 may be gathered by communication devices 420 during normal operation of the communication devices 420 and may be communicated to the endpoint media device 116 according to one or more collection timing rules. Communication devices 420 may include a variety of smart devices configured to transmit packetized data via local network, the Internet, near field communications, Bluetooth and/or the like. Some communication devices 420 may be configured with sensors for monitoring viewer movement within an environment such as motion sensors, heat sensors, image sensors, etc., and may track the movement of a viewer including relocation within and egress from the environment. Viewer movement may also be tracked using audio input to communication devices throughout an extended environment such as a home. For example, audio input by a viewer to a personal digital assistant in a room remote from the endpoint media device 116 may indicate that the viewer is no longer in the vicinity of the endpoint media device 116. Transmission of the additional contextual data 410 from the personal digital assistant (e.g., the communication device 420) to the endpoint media device 116 may include this information, which may be used by the learning engine 239 to correlate the viewer movement with the content composite 180 output for playback at the time and determine a level of viewer interaction with that content composite 180.

Further, the communication devices 420 may support applications enabling viewer interaction with content associated with the particularized content items 177 of the content composite 180. These applications may provide access to URLs associated with products or services displayed in the content composite 180. Viewer interaction with phone call applications, web browsers, merchant applications, QR code scanners, and a variety of applications may be monitored and collected by the one or more communication device 420 and communicated to the endpoint media device 116. The contextual data 420 may be correlated to individual content composites 180 using containerization object 182 of content composites to enable the learning engine 239 to determine a level of viewer interaction with the content composite 180.

Additional contextual data 410 may also include a duration of time during which the viewer was absent from the vicinity of the endpoint media device 116 or interacting with the one or more communication devices 420. Limits on the duration of time that a viewer may pause, or fast forward through a segment of content composite, interact with a communication device in a manner unrelated to the content composite 180, or be absent from the vicinity of the endpoint media device 116 may be specified by a content provider. This time limit may be altered via control messages to the endpoint media device 116.

The learning engine 239 may map one or a combination of the various extra-composite metrics of the observation data 229 to the metrics of the particular composites 180 provided to a particular viewer. Based at least in part on taking into account such observation data 229 as part of a feedback loop, the learning engine 239 may employ an ongoing learning mode to develop personalized pattern data 216 for particular viewers or content receivers/devices generally, and to confirm, correct, and/or refine determinations made for personalized pattern data 216 for particular viewers or content receivers/devices generally. The content processing subsystem 111 may be configured to employ machine learning to process the observation data 229 and the content items 180 and to derive and develop the personalized pattern data 216. The content processing subsystem 111 may be configured to employ deep learning to process the observation data 229 and the content items 180 and to derive and develop the personalized pattern data 216. The learning engine 239 may be configured to perform any one or combination of features directed to matching or otherwise correlating the observation data 229—such as the device identification data 404, the device operation identification data 406, the temporal data 408, the contextual data 410, descriptive information of the content items 180, and/or the like—with intra-content metrics of the content items 180. The learning engine 239 may include logic to implement and/or otherwise facilitate any taxonomy, classification, categorization, correlation, mapping, qualification, scoring, organization, and/or the like features disclosed herein. In some embodiments, the learning engine 239 may include the matching engine 238.

The learning engine 239 may include a reasoning module to make logical inferences from a set of the detected and differentiated data to infer one or more patterns of activity for particular viewers and/or receivers/devices generally. A pattern-based reasoner could be employed to use various statistical techniques in analyzing the data in order to infer personalized pattern data 216 from the observation data 229. A transitive reasoner may be employed to infer relationships from a set of relationships related to the observation data 229. In various embodiments, the system automatically establishes and develops the personalized pattern data 216. However, the personalized pattern data 216 may be set up and/or tailored by users. With various embodiments, the personalized pattern data 216 may be automatically established and developed by the system.

The personalized pattern data 216 may be used by the learning engine 239 to identify patterns of behavior in viewer engagement or lack of engagement with a content composite 180. Observation data 229 may be passed as input to the learning engine 239 to refine personalized pattern data 216 for an account, subscription, and/or individual viewers over time. In an example, each instance of playback of a content composite 180 may occur along with the collection of temporal data 408 about the time of playback and contextual data 410 about the viewer's engagement with a digital assistant device (e.g., communication device 420) to use an offer code displayed in the content composite 180 to purchase an item. The temporal data 408 and the other contextual data 410 may be analyzed by the learning engine 239 and classified as a positive user interaction with the content composite 180. Conversely, playback of another content composite 180 may occur along with the collection of temporal data 408 and contextual data 410 indicating that the viewer used a mobile communication device such as a tablet (e.g., communication device 420) to browse a website unrelated to the product, service, or organization associated with the content composite 180. Analysis of this temporal data 408 and contextual data 410 by the learning engine 239 may result in a classification that the viewer interaction with the content composite 180 was negative, or that the viewer did not interact with the content composite 180. These classifications may be used to refine the personalized pattern data 216 and/or build a user profile including viewer preferences.

The feedback could be used for training the system to heuristically adapt conclusions, profiles, correlations, attributes, triggers, patterns, and/or the like to learn particular viewers and adapt content composite 180 provisioning to particular viewers, which may include requesting, searching for, and/or selecting particular types of adaptable content items 176 and/or content items 177 (e.g., which may be based at least in part on the metadata features disclosed herein) for content composite 180 creation. For example, the learning engine 239 may learn that a particular viewer tends to interact with content composites 180 that are directed to only certain types of products and/or services. Such interaction object type differentiation may be on the macro level, such as recognizing that a viewer tends to interact more with composites 180 directed to certain types of products, services, and/or offers and not other types of products, services, and/or offers.

Additionally, the learning engine 239 may learn that a particular viewer tends to interact with particular content composites 180 and/or types only after the particular content composite 180 and/or type has been presented to the viewer X number of times. Accordingly, the subsystem 111 may bias content composites 180 provisioning toward the types of products and/or services that tend to elicit viewer interaction, and decrease composite 180 provisioning frequency or cease provisioning for other types. Similarly, when the learning engine 239 learns that a particular viewer does not interact with particular content composites 180 and/or types after the particular content composite 180 and/or type has been presented to the viewer Y number of times, the subsystem 111 may cease provisioning the particular content composite 180 and/or type and instead provision different content composites 180 and/or types, as disclosed further herein. For example, the Y threshold may be greater that the X threshold, in some embodiments.

Further, the learning engine 239 may learn that a particular viewer tends to interact with content composites 180 that are directed to only certain types of products, services, and/or offers within a particular category. The viewer may interact directly with the content composite 180 on a playback device or may interact with one of the communication devices 420 by interacting with an application or website of the organization associated with the content composite 180, or purchasing a product or service associated with the products, services, and/or offers, discounts, or coupons of the content composite 180. For example, the viewer of a content composite 180 may use a tablet (e.g., communication device 420) to browse to a web site of a product shown in the content composite 180 every time advertisements for ladies' footwear are output for display. Such interactions may be classified by the learning engine 239 as positive viewer interactions in which the user tends to interact with the content composite 180 for the product type "ladies shoes." Accordingly, the subsystem 111 may likewise bias 181 content composites 180 provisioning toward such types of products, services, and/or offers and decrease or cease provisioning with respect to other types.

Additionally, the learning engine 239 may learn the display of content composites 180 that are directed to other types of products, services, and/or offers within a particular category tends to result in a particular viewer failing to interact with the content composite 180, choosing to interact with applications unrelated to the content composite 180 executing on the communication devices 420, or exiting the vicinity of the endpoint media device 116. For example, a viewer providing input to a communication device 420 to interact with content, applications, websites, etc. that is unrelated to the products, services, and/or offers to which the content composite 180 is directed, may be used by the learning engine 239 to determine that the viewer is not interacting with the content composite 180. For example, if the viewer directly engages with the endpoint media device to pause, fast forward, or change channels, or initiates phone calls or text messages on a mobile communication device (e.g. communication device 420) every time that an advertisement related to automobiles is output for display, then the learning engine 239 may classify the interactions as negative and determine that content composites 180 related to automobile advertisements are not interesting to the viewer. The content composite subsystem 111 may bias content composites 180 provisioning away from such types of products, services, and/or offers and increase the frequency of provisioning with respect to other types.

Further, viewer interaction differentiation may be on the micro level, such as recognizing that a viewer tends to interact more with composites 180 directed to certain types of offers, redeemable content items, promotions, etc. Accordingly, the subsystem 111 may likewise bias content composites 180 provisioning toward such types and decrease or cease provisioning with respect to other types.

Gathering and usage of contextual data 410 in developing personalized pattern data 216 may be implemented in a privacy preserving manner. The unnecessary disclosure of personally identifying information, health information, financial information, or information related to the habits of minors, may be filtered out or omitted from the observation data 229 collected by the endpoint media device 116 and/or communication devices 420. For example, content composite subsystem 111 may identify and filter out such information. Further, rules established in viewing profiles or viewing controls may restrict or limit the collection of observation data 229. Parental controls restricting the output of content for display may likewise restrict the collection of contextual data 410 from communication devices 420 to nondescript actions such as leaving the vicinity of the endpoint media device 116, which may be communicated from one or more smart devices or personal digital assistants (e.g., communication devices 420). Similarly, and regardless of viewer controls, viewer interaction with communication devices 420 to browse to websites of pharmaceutical or intimate nature may be filtered out of or omitted from collection as observation data 229. Omitting sensitive information from observation data 229 collection routines may improve the user experience by reducing the risk that the learning engine 239 will tailor the content composites 180 to feature particularized content items 177 directed to products, services, and organizations of a sensitive or private nature, and thereby reduce the risk of viewer embarrassment or exposure of private information.

Further, in situations where a pattern of more micro-level interactions detected for particular viewer, the subsystem 111 biasing 181 of composites 180 may include serial provisioning of composites 180 in a serial drill-down manner such that the first composites 180 provisioned may be directed to a more macro-level outcome and one or more composites 180 subsequently provisioned may be directed to more micro-level outcomes in accordance with the detected pattern. Thus, disclosed embodiments may provide for serial matching of composites 180 with respect to one another in order to provision the composites 180 with a trend that matches the detected pattern. As one possible example out of many, when viewer interaction with macro-level composite 180 directed to a macro-level product and/or service (e.g., a vehicle) results in a macro-level outcome by the viewer (e.g., an purchase, order, etc. of the vehicle), the biasing 181 may include ceasing provisioning of repeats and variations of the macro-level composite 180 to the viewer and may further include subsequently provisioning more micro-level content composites 180 directed to more micro-level outcomes (e.g., complementary products/services, such as warranties, accessories, etc.).

As part of such learning and adaptation processes, the subsystem 111 may bias composite 180 provisioning toward use of content items 177 from certain service provider systems 103 over other service provider systems 103. The learning engine 239 may perform correlation based at least in part on correlation rules that govern correlation of the personalized pattern data 216 to content items 177 and corresponding sources of the content items 177 based at least in part on metrics and availabilities of the content items 177 from the particular source systems 103. In various embodiments, the correlation may be based at least in part on the profiles of the service provider systems 103. In analyzing content items 177 received for particular service provider systems 103, the subsystem 111 may identify patterns of types of content items 177 and mapped which types of content items 177 are provided by which service provider systems 103. Based at least in part on such mapping, the subsystem 111 may prioritize use of content items 177 from particular service provider systems 103 where the content items 177 are of viewers directed to the types of interactions that match interaction patterns of a particular viewer.

Further, such biasing 181 of content items 177 from one or more systems 103 may include prioritizing attempts to pull content items 177 from one or more systems 103 based at least in part on speed and responsiveness of systems 103. The subsystem 111 may aggregate and develop service provider system metrics based at least in part on the speed and responsiveness of systems 103 demonstrated with previous attempts to pull one or more content items 177 within one or more historical time windows (e.g., previous day, five days, week, month, year, etc.). The service provider systems 103 may be scored based at least in part on the metrics, and an individual scores may be utilized in identifying preferential biasing 181 an attempt to pull content items 177 from respective systems 103. For example, the subsystem 111 may attempt to pull one or more content items 177 from a first set of one or more service provider systems 103 that has the highest score based on previous performance with respect to speed, timeliness, and a matching content items 177. In the case that no matching content items 177 are successfully pulled from the first set of one or more service provider system 103 within a time threshold after the initial request, then the subsystem 111 may pull one or more content items 177 from a second set of one or more service provider systems 103 that have lower scores. Such serial stages attempt to pull content items 177 may be continued with additional sets of lower scored systems 103. The time thresholds may be different for each stage (e.g., decreasing or increasing in time) and the size of the selected sets of service provider systems 103 may be different for each stage (e.g., decreasing or increasing in size). In cases where multiple such stages are necessary, the subsystem 111 may subsequently adjust metrics for the systems 103, taking into account the performance demonstrated with such stages of attempt to pull objects 177.

In some embodiments, the device identification data 404 may include endpoint media device 116 mappings that logically associate endpoint media devices 116 that are linked based on one or more commonalities. For example, the learning engine 239 may learn that a set of endpoint media devices 116 are mappable to a particular household, to a particular company, and/or the like. Consequently, the learning engine 239 may learn observation data 229 may be differentiated not only on individual bases (e.g., with respect to individual devices 116, accounts, user profiles, etc.), but also on collective bases (i.e., with respect to sets of devices 116, accounts, user profiles, etc.). Further, the adapting and provisioning of content items 176, 177, and/or composites 180 may be based at least in part on the learning of such logical associations. For example, each endpoint media device 116 of a set of endpoint media devices 116 mapped to a particular household may be provisioned with a common set of content items 176, 177, and/or composites 180, regardless of the previous content items 176, 177, and/or composites 180 provisioned to each endpoint media device 116 in the set. In some embodiments, the common set of content items 176, 177, and/or composites 180 may be related to, but different from, one or more previous content items 176, 177, and/or composites 180 provisioned to one or more endpoint media devices 116 in the set for a shared experience. Likewise, the common set of content items 176, 177, and/or composites 180 may be related to one or more interactions one or more endpoint media device 116 in the set with one or more previous content items 176, 177, and/or composites 180 provisioned to one or more of the endpoint media devices 116. For example, a user selection of a hyperlink in a content composite 180 may trigger a related content item 177 being provisioned to all endpoint media devices 116 in the set. In like manner, any of the features disclosed herein with respect to adapting, provisioning, and biasing content items 176, 177, and/or composites 180 may be based at least in part on such linking of endpoint media devices 116.

In some embodiments, user profiles may be stored in a storage medium of an endpoint device 116 and may include stored user preferences that may be inferred by the endpoint device 116 based at least in part on viewing history. Additionally or alternatively, user profiles may be stored in the cloud (e.g., by the subsystem 111 of the service provider system 102). Accordingly, user profile data (e.g., data that contributes to a user profile) may be communicated to the backend subsystem 111 in some embodiments. This may, for example, facilitate embodiments where features of the endpoint device 116 are provided via virtual instances (e.g., a virtual set-top box).

The user profiles may also include the contextual data 410 relating to a viewer's interactions with other communication devices 420 while content composites 180 are output for display. The endpoint device 116 may communicate user profile information to the service provider system(s) 102, 103 to request adaptable content items 176 and particularized content items 177 tailored to the inferred user preferences or disinterest to provision content composites 180 in accordance with certain embodiments disclosed herein. The user profiles may include profiles for multiple users or may include a single profile for the television receiver in general. In some embodiments, the user profiles may include preferences for customized content presentation adjustments disclosed herein. The preferences could include customized viewing interests, such as programming content, advertising content, product content, and/or the like that corresponds to augmented content selections relating to recognized actors and/or products. The user profiles may further include user feedback, via user-selectable options, received from the user regarding customizations. The feedback data may be used to refine the customizations for particular viewers and types of content customizations.

Figure 5:
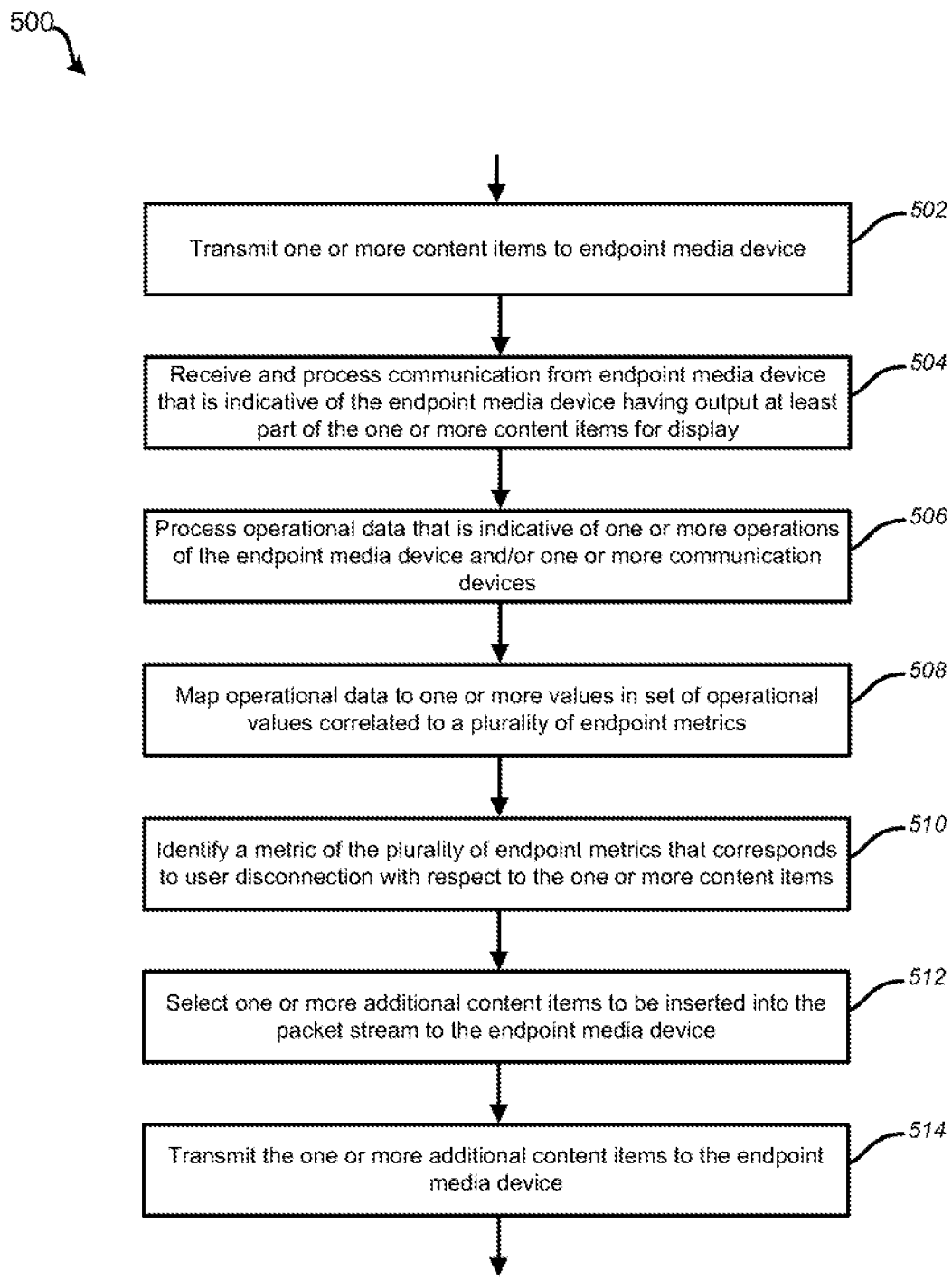
FIG. 5 illustrates a process flow diagram of a method to adapt delivery of content items to an endpoint media device, in accordance with disclosed embodiments of the present disclosure.

FIG. 5 illustrates a process flow diagram of a method 500 to adapt delivery of content items (e.g., content items 176, 177, and/or composites 180) to an endpoint media device 116, in accordance with disclosed embodiments of the present disclosure. As indicated by block 502, one or more content items may be transmitted to the endpoint device 116. According to some instances, the one or more content items may correspond to one or more composites 180 and/or one or more content items 176. In some embodiments where the endpoint media device 116 creates composites 180, the one or more content items may correspond to content items 176 and content items 177. As disclosed herein, in various embodiments, the content items may be transmitted by the systems 102 and/or 103 one or more networks 120 to an endpoint media device 116.

The one or more content items may be transmitted with one or more containerization objects 182 disclosed herein. Each containerization object 182 may include a container flag 184 identifying the one or more content items. This container flag 184 may enable the endpoint media device 116 and/or the content provider system 102 to track playback of the one or more content items as it is output for display and to associate device operations events occurring during playback of the one or more content items.

As indicated by block 504, a communication from the endpoint device 116 may be received and processed. In some embodiments, the service provider system 102 may receive and process the communication. The communication may correspond to a return notification disclosed herein. The communication may be a context communication that is indicative of the endpoint media device 116 having output at least part of the one or more content items for display. For example, the content provider system 102 may receive a packetized message including a content communication indicating, such as by arrangement of bits, a container flag 184, or other identifier, that at least part of the one or more content items has been output for display on display device 160.

As indicated by block 506, operational data that is indicative of one or more operations executed by one or one or more of the endpoint media device 116 and one or more communication devices 420 may be processed. As disclosed herein, the communication devices 420 may correspond to various types of devices and data sources (e.g., smartphones, laptops, smart wearable devices, smart devices, personal digital assistant devices, etc.) that may communicate respective operational data to the endpoint media 116, which may, in turn, communicate the operational data aggregated from one or more communication devices 420 to the subsystem 111, which may be remotely located in the service provider system 102 and/or may reside in the endpoint media device 116 according to various embodiments. Additionally or alternatively, one or more of the communication devices 420 may bypass the endpoint media device 116 and transmit respective operational data to the subsystem 116 in some embodiments.

In various embodiments, the operational data may be communicated with the communication indicated by block 504 and/or may be communicated from one or more of the communication devices 420 within an environment of the endpoint media device 116 and/or a backend system 103 as disclosed herein. The operational data may correspond to the contextual data 229 disclosed herein. For example, the operational data may correspond to information about user interactions occurring during output of the one or more content items. In some embodiments, this may include user activity data collected by the endpoint media device 116 from the one or more communication device 420.

As indicated by block 508, the operational data may be mapped to one or more values in a set of operational values correlated to a plurality of endpoint metrics. As indicated by block 510, a metric of the plurality of endpoint metrics that corresponds to endpoint connection or disconnection with the one or more content items may be identified. The learning engine 239 may perform the mapping and metric identification. In some embodiments, the endpoint media device 116 may detect, within a time frame of playback of the one or more content items, contextual data of one or more of the types disclosed herein. For example, the operational data may be scored according to a scoring system to quantify indicia of endpoint connection or disconnection with a numerical expression, for example, an engagement score, with higher scores being assigned to higher levels of viewer engagement with the one or more content items. Relatively higher scores may be assigned to endpoint selections of an interactive content item 177 that is redeemable for discount product(s) and/or service(s) (i.e., a redeemable content item, such as an ecoupon), matrix code such as a QR code, trailer, movie content, and/or the like. Such selections may include saving a content item 177 by the device 116 (e.g., in a digital wallet). Even higher scores may be assigned to indicia of redemption of the content item 177, the detection of which is disclosed in an incorporated application. Mid-level scores may be assigned to indicia of that the one or more content items were output for display by the endpoint media device 116 without any additional indicia of endpoint connection (e.g., user interest) or disconnection (e.g., user disinterest).

Lower scores may be assigned when indicia of disconnection in the one or more content items is detected. The content provider system 102 may determine based on the context communication that a user not only did not interact with the one or more content items, but further interacted with the endpoint media device 116 to disrupt playback of the one or more content items or the collected user activity data indicates that any user interaction with the one or more communication devices 420 is not related to the one or more content items. For example, the operational data may include indicia of one or more inputs received from a user interface of the endpoint media device 116 and/or operational data received from the one or more communication devices 420. This may, for example, correspond to received input that may include a command for one or more of pausing playback, skipping forward in time, or changing channels.

Additionally or alternatively, the content provider system 102 may identify from the context communication information about whether user interactions occurring during output of the one or more content items were related to the source, content, products, services, offers, or coupons associated with the one or more content items. The operational data may correspond to user activity data that indicates characteristics of user interaction with the one or more communication devices 420, such as indicia of a duration of user interaction with the one or more communication devices 420, indicia of whether the user interaction is related to the one or more content items, and/or a indicia of whether an organization associated with the user interaction with the one or more communication devices 420 is associated with the one or more content item. In some examples, the user interaction may correspond to one or more of loading content per a uniform resource locator (URL), an operation of a digital assistant, a command from a remote control device, and/or a selection via an application. When such interaction is not related to the one or more content items, the interaction may be assigned a lower engagement score. In some examples, the interaction may correspond to a change in endpoint location with respect to the endpoint media device 116. Additionally or alternatively, as disclosed herein, this may include one or more of a detection that the user left a vicinity of the endpoint media device 116 or the user changed locations within the vicinity of the endpoint media device 116, each of which may be assigned a lower engagement score. The operational data may include other types of contextual data disclosed herein.

The endpoint metric may correspond to a classification of a level of endpoint connection or disconnection with the one or more content items. Such classifications may be based at least in part on the engagement score and may include classification values corresponding to very high engagement, high engagement, moderate engagement, low engagement, very low engagement, and/or the like. The classified level of engagement with the one or more content items may be stored in a user profile within a local cache of the endpoint media device 116. In some embodiments where the endpoint device 116 performs the mapping and identification of the endpoint metric, this user profile may be used to generate the context communication transmitted to the system 102.

As indicated by block 512, responsive to a determination of endpoint disconnection with the one or more content items (e.g., low user engagement), one or more additional content item to be inserted into the packet stream to the endpoint media device 116 may be selected, where the one or more additional content items are identified as being different from the previously provisioned one or more content items based at least in part on metadata of the one or more additional content items. The content provider system 102 may identify within a repository 222, a product, service, or organization associated with the one or more content items using the one or more associated content flags (e.g., container flags 184). Because the one or more container flags 184 can be used to identify the one or more containerization objects 182 of the one or more content items, the content service provider 102 may easily search for attributes, characteristics, and/or category identifiers associated with the one or more content items using the one or more container flags 184. The content provider system 102 may quickly and efficiently select one or more additional content items that are associated with at least one different product, service, or organization than that of the previously provisioned one or more content items. In some embodiments, the subsystem 111 may push indicia of one or more prohibited attributes, characteristics, and/or category identifiers to one or more service provider systems 102 and/or 103 to pull additional content items that are not associated with at least one of the one or more prohibited attributes, characteristics, and/or category identifiers.

As indicated by block 514, the content provider system 102 may insert the one or more additional content items into the packet stream. One or more containerization objects 182 for the one or more additional content items may be generated or obtained in order to insert the one or more additional content items into the packet stream for transmission while facilitating the features disclosed herein. As indicated by block 516, the content provider system 102 may transmit the one or more additional content items via the packet stream from the content provider system 102 to the endpoint media device 116 via the one or more networks 120. For example, the content service provider 102 may utilize a transceiver to transmit the containerization object 182 of the one or more additional content items via the packet stream over the one or more networks 120.

Further details regarding embodiments of receivers corresponding to receivers 116e and of computing devices 116 that make use of, interact with, and/or at least partially include the subsystem 111 are disclosed in the applications incorporated by reference herein. Likewise, further details regarding a computer system that may be incorporated as part of the previously described computerized devices, such as a television receiver 116e, device(s) 116, and/or content provider system 102 are disclosed in the applications incorporated by reference herein.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method to adapt delivery of content composites to an endpoint media device, the method comprising:

causing transmission of a first content composite via a packet stream from a content provider system via one or more networks to the endpoint media device, where the first content composite comprises a redeemable content item;

processing a communication from the endpoint media device that is indicative of the endpoint media device having output at least part of the first content composite for display;

processing operational data from the endpoint media device that is indicative of one or more operations executed by one or both of the endpoint media device and a communication device, where the operational data comprises data that is indicative of the one or more operations and that is restricted in accordance with a rule that specifies one or more restrictions on collection of the data, where the communication device is different from the endpoint media device, and where at least one operation of the one or more operations corresponds to redeeming the redeemable content item;

mapping the operational data to one or more values in a set of operational values correlated to a plurality of endpoint metrics that take into account whether a user opted out of one or more content composites;

consequent to the mapping of the operational data to the one or more values, identifying a metric of the plurality of endpoint metrics that corresponds to endpoint use of the redeemable content item;

consequent to the identifying of the metric, selecting a second content composite to be inserted into the packet stream to the endpoint media device, where the second content composite is identified as being different from the first content composite based at least in part on metadata of the second content composite; and causing transmission of the second content composite via the packet stream from the content provider system via the one or more networks to the endpoint media device.

2. The method to adapt delivery of content composites to an endpoint media device as recited in claim 1, where:
the first content composite is associated with a first content flag identifying the first content composite;
the second content composite is associated with a second content flag identifying the second content composite; and
the second content flag comprises the metadata of the second content composite.

3. The method to adapt delivery of content composites to an endpoint media device as recited in claim 2, where the selecting the second content composite comprises:
identifying, within a content repository, a content specification associated with the first content composite using the first content flag; and
identifying the second content composite as associated with a different content specification.

4. The method to adapt delivery of content composites to an endpoint media device as recited in claim 1, the method further comprising:
detecting, within a time frame of playback of the first content composite, contextual data comprising activity data received from the communication device;
communicating the contextual data to a learning engine to classify a level of endpoint disconnection with the first content composite, where the level of endpoint disconnection corresponds to the identified metric; and
storing the classified level of endpoint disconnection with the first content composite in an endpoint file.

5. The method to adapt delivery of content composites to an endpoint media device as recited in claim 4, wherein the one or more operations correspond to at least one of a command for one or more of pausing playback, skipping forward in time, or changing channels.

6. The method to adapt delivery of content composites to an endpoint media device as recited in claim 4, wherein the activity data indicates one or both of:
a first indication of a duration of interaction with the communication device; and
a second indication of whether the interaction is related to the first content composite.

7. The method to adapt delivery of content composites to an endpoint media device as recited in claim 6, wherein the interaction corresponds to one or more of loading content per a uniform resource locator, an operation of a digital assistant, a command from a remote control device, and/or a selection via an application.

8. The method to adapt delivery of content composites to an endpoint media device as recited in claim 6, wherein the interaction corresponds to a change in endpoint location with respect to the endpoint media device.

9. A system to adapt delivery of content composites to an endpoint media device, the system comprising:
one or more processing devices; and
memory communicatively coupled with and readable by the one or more processing devices and having stored therein processor-readable instructions which, when executed by the one or more processing devices, cause the one or more processing devices to perform operations comprising:
causing transmission of a first content composite via a packet stream from a content provider system via one or more networks to the endpoint media device, where the first content composite comprises a redeemable content item;
processing a communication from the endpoint media device that is indicative of the endpoint media device having output at least part of the first content composite for display;
processing operational data from the endpoint media device that is indicative of one or more operations executed by one or both of the endpoint media device and a communication device, where the operational data comprises data that is indicative of the one or more operations and that is restricted in accordance with a rule that specifies one or more restrictions on collection of the data, where the communication device is different from the endpoint media device, and where at least one operation of the one or more operations corresponds to redeeming the redeemable content item;
mapping the operational data to one or more values in a set of operational values correlated to a plurality of endpoint metrics that take into account whether a user opted out of one or more content composites;
consequent to the mapping of the operational data to the one or more values, identifying a metric of the plurality of endpoint metrics that corresponds to endpoint use of the redeemable content item;
consequent to the identifying of the metric, selecting a second content composite to be inserted into the packet stream to the endpoint media device, where the second content composite is identified as being different from the first content composite based at least in part on metadata of the second content composite; and
causing transmission of the second content composite via the packet stream from the content provider system via the one or more networks to the endpoint media device.

10. The system to adapt delivery of content composites to an endpoint media device as recited in claim 8, where:
the first content composite is associated with a first content flag identifying the first content composite;
the second content composite is associated with a second content flag identifying the second content composite; and
the second content flag comprises the metadata of the second content composite.

11. The system to adapt delivery of content composites to an endpoint media device as recited in claim 10, where the selecting the second content composite comprises:
identifying, within a content repository, a content specification associated with the first content composite using the first content flag; and
identifying the second content composite as associated with a different content specification.

12. The system to adapt delivery of content composites to an endpoint media device as recited in claim 9, the operations further comprising:
detecting, within a time frame of playback of the first content composite, contextual data comprising activity data received from the communication device;
communicating the contextual data to a learning engine to classify a level of endpoint disconnection with the first content composite, where the level of endpoint disconnection corresponds to the identified metric; and
storing the classified level of endpoint disconnection with the first content composite in an endpoint file.

13. The system to adapt delivery of content composites to an endpoint media device as recited in claim 12, wherein the one or more operations correspond to at least one of a command for one or more of pausing playback, skipping forward in time, or changing channels.

14. The system to adapt delivery of content composites to an endpoint media device as recited in claim 12, wherein the activity data indicates one or both of:
a first indication of a duration of interaction with the communication device; and
a second indication of whether the interaction is related to the first content composite.

15. The system to adapt delivery of content composites to an endpoint media device as recited in claim 14, wherein the interaction corresponds to one or more of loading content per a uniform resource locator, an operation of a digital assistant, a command from a remote control device, and/or a selection via an application.

16. The system to adapt delivery of content composites to an endpoint media device as recited in claim 14, wherein the interaction corresponds to a change in endpoint location with respect to the endpoint media device.

17. One or more non-transitory, machine-readable media having machine-readable instructions thereon which, when executed by one or more processing devices, cause the one or more processing devices to perform operations comprising:
causing transmission of a first content composite via a packet stream from a content provider system via one or more networks to an endpoint media device, where the first content composite comprises a redeemable content item;
processing a communication from the endpoint media device that is indicative of the endpoint media device having output at least part of the first content composite for display;
processing operational data from the endpoint media device that is indicative of one or more operations executed by one or both of the endpoint media device and a communication device, where the operational data comprises data that is indicative of the one or more operations and that is restricted in accordance with a rule that specifies one or more restrictions on collection of the data, where the communication device is different from the endpoint media device, and where at least one operation of the one or more operations corresponds to redeeming the redeemable content item;
mapping the operational data to one or more values in a set of operational values correlated to a plurality of endpoint metrics that take into account whether a user opted out of one or more content composites;
consequent to the mapping of the operational data to the one or more values, identifying a metric of the plurality of endpoint metrics that corresponds to endpoint use of the redeemable content item;
consequent to the identifying of the metric, selecting a second content composite to be inserted into the packet stream to the endpoint media device, where the second content composite is identified as being different from the first content composite based at least in part on metadata of the second content composite; and
causing transmission of the second content composite via the packet stream from the content provider system via the one or more networks to the endpoint media device.

18. The one or more non-transitory, machine-readable media as recited in claim 17, where:
the first content composite is associated with a first content flag identifying the first content composite;
the second content composite is associated with a second content flag identifying the second content composite; and
the second content flag comprises the metadata of the second content composite.

19. The one or more non-transitory, machine-readable media as recited in claim 18, where the selecting the second content composite comprises:
identifying, within a content repository, a content specification associated with the first content composite using the first content flag; and
identifying the second content composite as associated with a different content specification.

20. The one or more non-transitory, machine-readable media as recited in claim 17, the operations further comprising:
detecting, within a time frame of playback of the first content composite, contextual data comprising activity data received from the communication device;
communicating the contextual data to a learning engine to classify a level of endpoint disconnection with the first content composite, where the level of endpoint disconnection corresponds to the identified metric; and
storing the classified level of endpoint disconnection with the first content composite in an endpoint file.

* * * * *